United States Patent
Mar et al.

(10) Patent No.: US 10,055,682 B2
(45) Date of Patent: Aug. 21, 2018

(54) SELF-OPTIMIZING DEPLOYMENT CASCADE CONTROL SCHEME AND DEVICE BASED ON TDMA FOR INDOOR SMALL CELL IN INTERFERENCE ENVIRONMENTS

(71) Applicant: YUAN ZE UNIVERSITY, Taoyuan (TW)

(72) Inventors: Jeich Mar, Taoyuan (TW); Guan-Yi Liu, Taoyuan (TW)

(73) Assignee: YUAN ZE UNIVERSITY, Taoyuan (TW)

( * ) Notice: Subject to any disclaimer, the term of this patent is extended or adjusted under 35 U.S.C. 154(b) by 113 days.

(21) Appl. No.: 15/214,544

(22) Filed: Jul. 20, 2016

(65) Prior Publication Data
US 2017/0105210 A1     Apr. 13, 2017

(30) Foreign Application Priority Data
Oct. 13, 2015 (TW) .............................. 104133586 A

(51) Int. Cl.
| | |
|---|---|
| H04W 72/04 | (2009.01) |
| G06N 3/04 | (2006.01) |
| H04B 7/02 | (2018.01) |
| H04B 7/26 | (2006.01) |
| H04W 52/50 | (2009.01) |

(Continued)

(52) U.S. Cl.
CPC ........... *G06N 3/0436* (2013.01); *H04B 7/026* (2013.01); *H04B 7/2643* (2013.01); *H04B 17/3912* (2015.01); *H04W 52/242* (2013.01); *H04W 52/367* (2013.01); *H04W 52/50* (2013.01);

(Continued)

(58) Field of Classification Search
CPC . H04W 52/242; H04W 52/367; H04W 52/50; H04W 52/225; H04W 84/045; H04B 17/3912; H04B 7/2643; H04B 7/026; G06N 3/0436
See application file for complete search history.

(56) References Cited

U.S. PATENT DOCUMENTS

| | | | | |
|---|---|---|---|---|
| 2004/0015906 | A1* | 1/2004 | Goraya ................. | G06N 5/022 717/141 |
| 2009/0326419 | A1* | 12/2009 | Gonzalez Rojas .. | A61B 5/1101 600/587 |

(Continued)

*Primary Examiner* — Brian D Nguyen
(74) *Attorney, Agent, or Firm* — WPAT, PC

(57) ABSTRACT

The invention presents a self-optimizing deployment scheme and device for indoor small cell. Based on time division multiplexing access (TDMA) resource assignment, an adaptive neural fuzzy inference system (ANFIS) based self-optimizing deployment cascade control (SODCC) device is proposed for indoor small cell to enable easy installation, multi-user (MU) service reliability, optimum throughput, power saving, minimum interference and good cell coverage. The proposed SODCC device is designed with a cascade architecture, which mainly contains an ANFIS based initial power setting controller (IPSC) in the first unit, an ANFIS based channel quality index (CQI) decision controller (CQIDC) in the second unit and an ANFIS based self-optimizing power controller (SOPC) in the third unit. In addition, a protection mechanism of the self-optimizing power controller is included in the SODCC device to prevent the co-channel interference from the moving users of adjacent cells.

9 Claims, 30 Drawing Sheets

(51) Int. Cl.
    *H04B 7/026*     (2017.01)
    *H04W 52/24*     (2009.01)
    *H04W 52/36*     (2009.01)
    *H04B 17/391*     (2015.01)
    *H04W 84/04*     (2009.01)
    *H04W 52/22*     (2009.01)

(52) U.S. Cl.
    CPC ........ *H04W 52/225* (2013.01); *H04W 84/045* (2013.01)

(56) References Cited

U.S. PATENT DOCUMENTS

| | | | |
|---|---|---|---|
| 2013/0024191 A1* | 1/2013 | Krutsch | G10L 21/038 |
| | | | 704/205 |
| 2014/0087749 A1* | 3/2014 | Mar | H04L 5/0023 |
| | | | 455/452.2 |
| 2016/0226253 A1* | 8/2016 | Abido | H02J 3/383 |

\* cited by examiner

SELF-OPTIMIZING DEPLOYMENT CASCADE CONTROL SCHEME AND DEVICE BASED ON TDMA FOR INDOOR SMALL CELL IN INTERFERENCE ENVIRONMENTS

FIELD OF THE INVENTION

The invention presents a time division multiplexing access (TDMA) based adaptive neural fuzzy inference system (ANFIS) self-optimization deployment cascade control (SODCC) device for indoor small cell operated in the multi-user (MU) and interference environments to self-optimize the MU service reliability (SR), throughput, minimum transmit power and interference for multimedia call services. The SODCC device mainly contains an ANFIS based initial power setting controller (IPSC) in the first unit, an ANFIS based channel quality index (CQI) decision controller (CQIDC) in the second unit and an ANFIS based self-optimizing power controller (SOPC) in the third unit. In addition, a protection mechanism of SOPC is included in the SODCC device to prevent the co-channel interference from the moving users of adjacent cells.

BACKGROUND OF THE INVENTION

Currently, the macrocells are deployed by operators. Since the deployment of femtocells can be in orders of magnitude more numerous than traditional cellular deployments and a network operator may not be able to control the femtocells directly. The femtocells are self-deployed by users rather than operators. Therefore, the femtocell base station's (BS) self-optimization deployment control software must have the characteristics of easy operation to make the BS with the least human action to satisfy the required performance, which are stated hereinafter.

The user just needs to plug-and-play and the BS of the femtocell can automatically configure the system parameters in the MU and interference indoor environments. In addition, the self-optimization control software deployed in an interference environment can self-optimization control the transmit power of the BS to save energy, reduce co-channel interference for the adjacent cell, and meet the requirement of service reliability. User input settings include service reliability, the cell edge throughput corresponding to the cell edge CQI and cell radius to match the size of the room coverage.

A previous study [1] has proposed a coverage adaptation approach for femtocell deployment in order to minimize the increase of core network mobility signaling. The information on mobility events of passing and indoor users are used to optimize the femtocell coverage. An approach based on genetic algorithm was presented in [2] to automatically optimize the coverage of a group of femtocells in an enterprise environment. The algorithm is able to dynamically update the pilot powers of the femtocells as per the time varying global traffic distribution and interference levels. The algorithm in a decentralized femtocell deployment has not been considered. [3] has proposed an adaptive neural fuzzy inference system (ANFIS)-assisted power control scheme for a multi-rate multimedia direct-sequence code-division multiple-access (DS-CDMA) system to precisely predict the channel variations and thus compensate for the effect of signal fading in advance. The author in the above study also provides a procedure for determining the transmission rate based upon the output of the signal-to-interference and noise ratio (SINR) increment of the ANFIS power control mechanisms at the sample period. The fuzzy membership functions of ANFIS power control mechanisms use seven Gaussian functions, so that there are 49 fuzzy inference rules. The ANFIS power control mechanisms use two input variables, including SINR error e(n) and SINR error change Δe(n), to track the set point of target SINR. In the present technique, the target SINR value is set to a fix value of 1.5 dB, let the power control process is not flexible enough. The input parameters of ANFIS power control mechanism totally depend on SINR control efficiency. The power cannot be controlled by channel environment. The technology has not considered the performance of multi-user (MU) service reliability (SR).

[1] Holger Claussen et al., Self-optimization of Coverage for Femtocell Deployments, Bell Labs Technical Journal—Core and Wireless Networks, Volume 14 Issue 2, August 2009, Pages 155-183.

[2] Lina S. Mohjazi et al., Self-Optimization of Pilot Power in Enterprise Femtocells Using Multi objective Heuristic, Journal of Computer Networks and Communications, Volume 2012.

[3] C. H. Jiang, J. K. Lian, R. M. Weng, C. H. Hsu, "Multi-rate DS-CDMA with ANFIS-assisted power control for wireless multi-media communications," International Journal of Innovative Computing, Information and Control, vol. 6, no. 8, pp. 3641-3655, August 2010.

SUMMARY OF THE INVENTION

In view of the disadvantages of prior art, the primary object of the present invention is to present a time division multiplexing access (TDMA) based adaptive neural fuzzy inference system (ANFIS) [4] self-optimizing deployment cascade control (SODCC) device for indoor small cell operated in the multi-user (MU) and interference environments. The principal object of the present invention is that it can autonomously control the assignments of initial power, the best channel quality index (CQI) and the minimum transmit power, so that the indoor small cell can produce the optimum throughput, minimum transmit power and interference for multimedia services. The present invention uses ANFIS architecture to adapt the initial power setting to the requested SR, throughput at the cell edge and coverage; to adapt the best CQI to the initial power setting and average path loss (PL) measured by user equipment (UE); to adapt the transmit power assignment to the requested SR, throughput at the cell edge, the best CQI and measured average SINR. The present intelligent SODCC device is design to self-optimize the signal-to-interference-plus-noise (SINR) and throughput service reliabilities of the indoor small cell in the multi-user (MU) and interference environments, while maintaining the blocking error rate (BLER) less than $10^{-1}$ and minimizing the transmit power and interference power to achieve the aims of energy saving and interference reducing.

[4] Jyh-Shing Roger Jang, "ANFIS: Adaptive-Network-Based Fuzzy Inference System", IEEE Transaction on System, Man, and Cybernetics, Vol. 23, NO. 3, June 1993.

Other aspects and advantages of the present invention will become apparent from the following detailed description, taken in conjunction with the accompanying drawings, illustrating by way of example the principles of the present invention.

BRIEF DESCRIPTION OF THE TABLES

Table 1 shows system simulation parameters.
Table 2 shows simulation parameters of DL SISO OFDM transceiver
Table 3 shows SNR threshold and cell edge throughput for different cell edge CQI
Table 4 shows fade margin for different service reliabilities
Table 5 shows fuzzy inference rule for the IPSC
Table 6 shows fuzzy inference rule for the CQIDC
Table 7 shows fuzzy inference rule for the SOPC

CRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

The invention presents an adaptive neural fuzzy inference system (ANFIS) based self-optimization deployment cascade control (SODCC) device for indoor small cell operated in the multi-user (MU) and interference environments to self-optimize the MU service reliability (SR), average throughput, transmit power and interference for multimedia call services.

Figure 1:
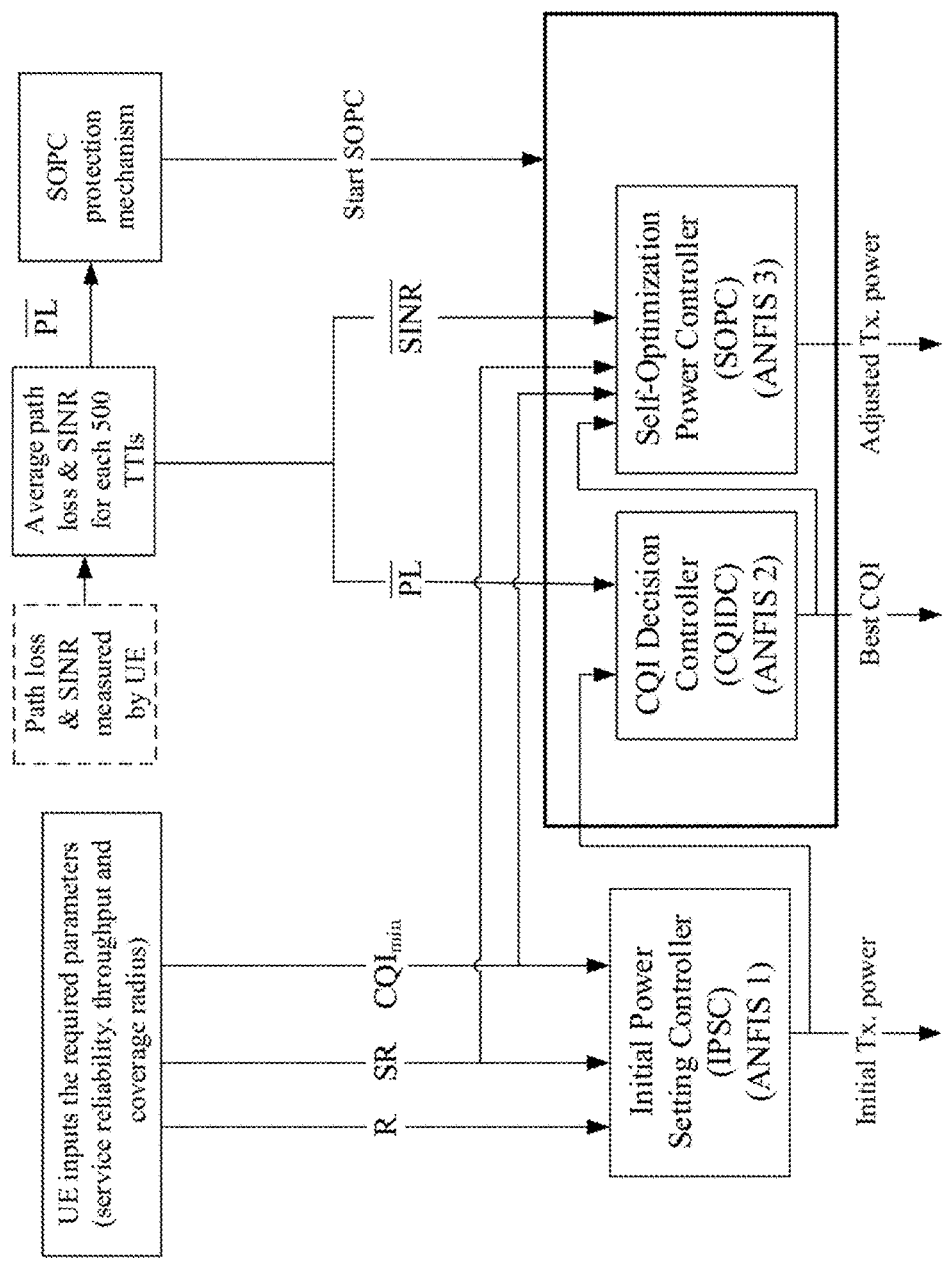
FIG. 1 is a block diagram of self-optimization deployment cascade control (SODCC) device for indoor small cell.

The principal structure of the present invention is an ANFIS based self-optimization deployment cascade control (SODCC) device as shown in FIG. 1; it mainly contains an ANFIS based initial power setting controller (IPSC) in the first unit, an ANFIS based channel quality index (CQI) decision controller (CQIDC) in the second unit and an ANFIS based self-optimizing power controller (SOPC) in the third unit. In addition, a self-optimizing power controller protection mechanism is included in the SODCC device to prevent the co-channel interference from the moving users of adjacent cells. In order to complete the intelligent deployment of small cells, the present invention is to use adaptive network architecture established by Jjh Shing Roger Jang in 1993, known as ANFIS [4], which is a fuzzy inference system. By using a hybrid learning method, the weights of ANFIS controller are adjusted to the appropriate value. The user inputs the parameters including the service reliability, coverage radius and the throughput at the cell edge. The user equipment (UE) measures the reference signal received power (RSRP) and sends back the estimated average path loss (PL) and signal-to-interference-plus-noise ratio (SINR) to the SODCC device. The proposed intelligent SODCC device is design to self-optimize the minimum transmit power of the indoor small cell in the multi-user (MU) and interference environments, while maintaining the blocking error rate (BLER) of the transceiver less than $10^{-1}$, and satisfying the requirements of average throughput and service reliability for the UE.

Figure 2:
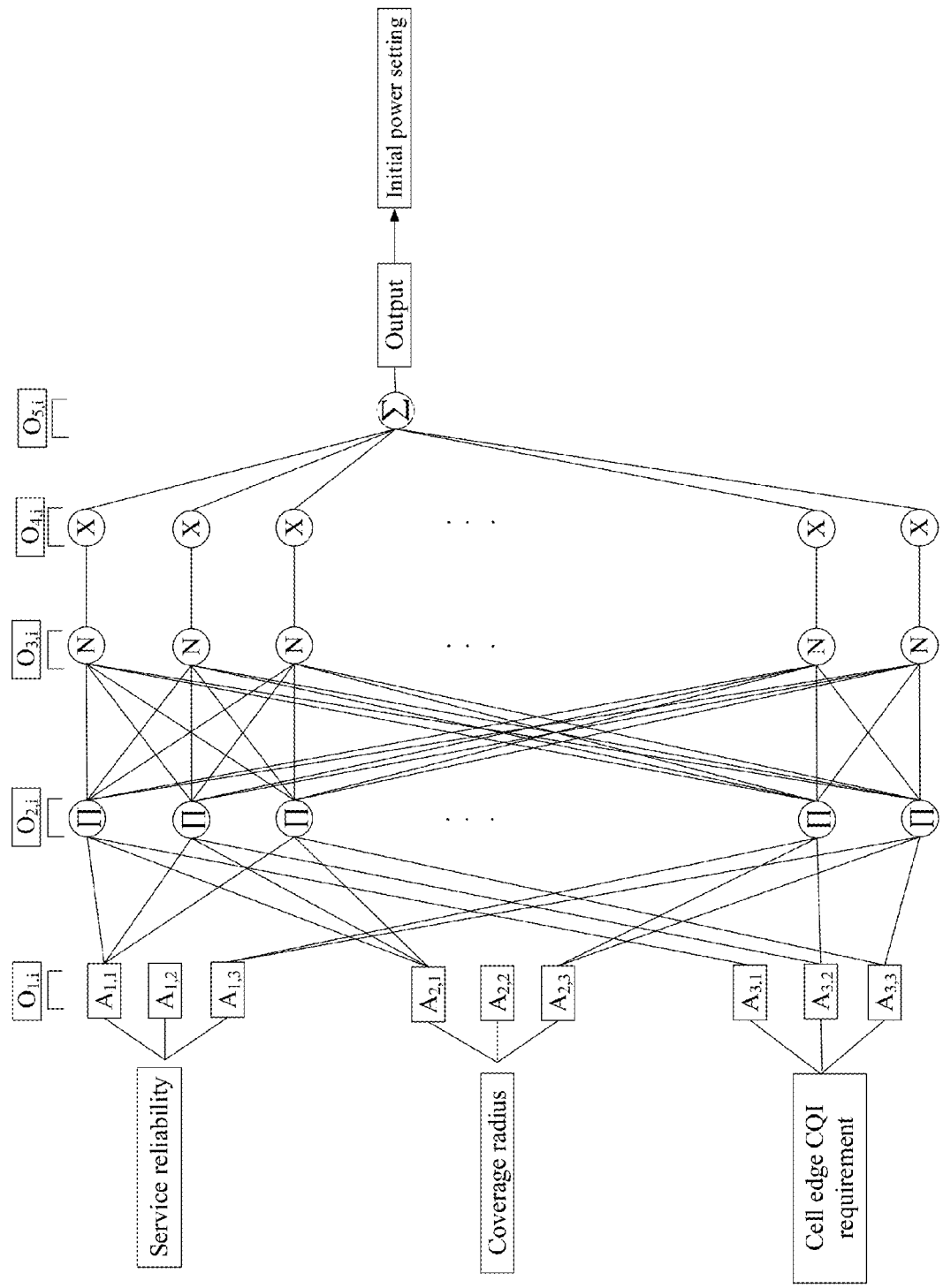
FIG. 2 shows the architecture of an ANFIS based initial power setting controller (IPSC) unit.

The architecture diagram of ANFIS based ISPC unit is shown in FIG. 2, which contains five tiers, a total of three inputs and one output. Three input parameters of ANFIS are the requested SR, coverage radius of indoor office, and the cell edge CQI that is defined as $CQI_{min}$, the output parameter is a minimum transmit power. The ISPC unit adapts the initial power setting to the changing SR, coverage radius and $CQI_{min}$. The generalized bell shape membership function of each input parameter is divided into three levels. There are 27 fuzzy inference rules. The ISPC defines the SR of 70%~80% as low (L), it defines 81%~90% as medium (M), it defines 91%~99% as high (H); it defines the coverage range of less than 5 m as low (L), it defines 6 m~10 m as medium (M), it defines 11 m~15 m as high (H); it defines $CQI_{min}$ in 1~5 for L, it defines $CQI_{min}$ in 6~10 for M, it defines $CQI_{min}$ in 11~15 for H; the output is the initial power setting, which satisfies the user requests under interference free environments.

Figure 3:
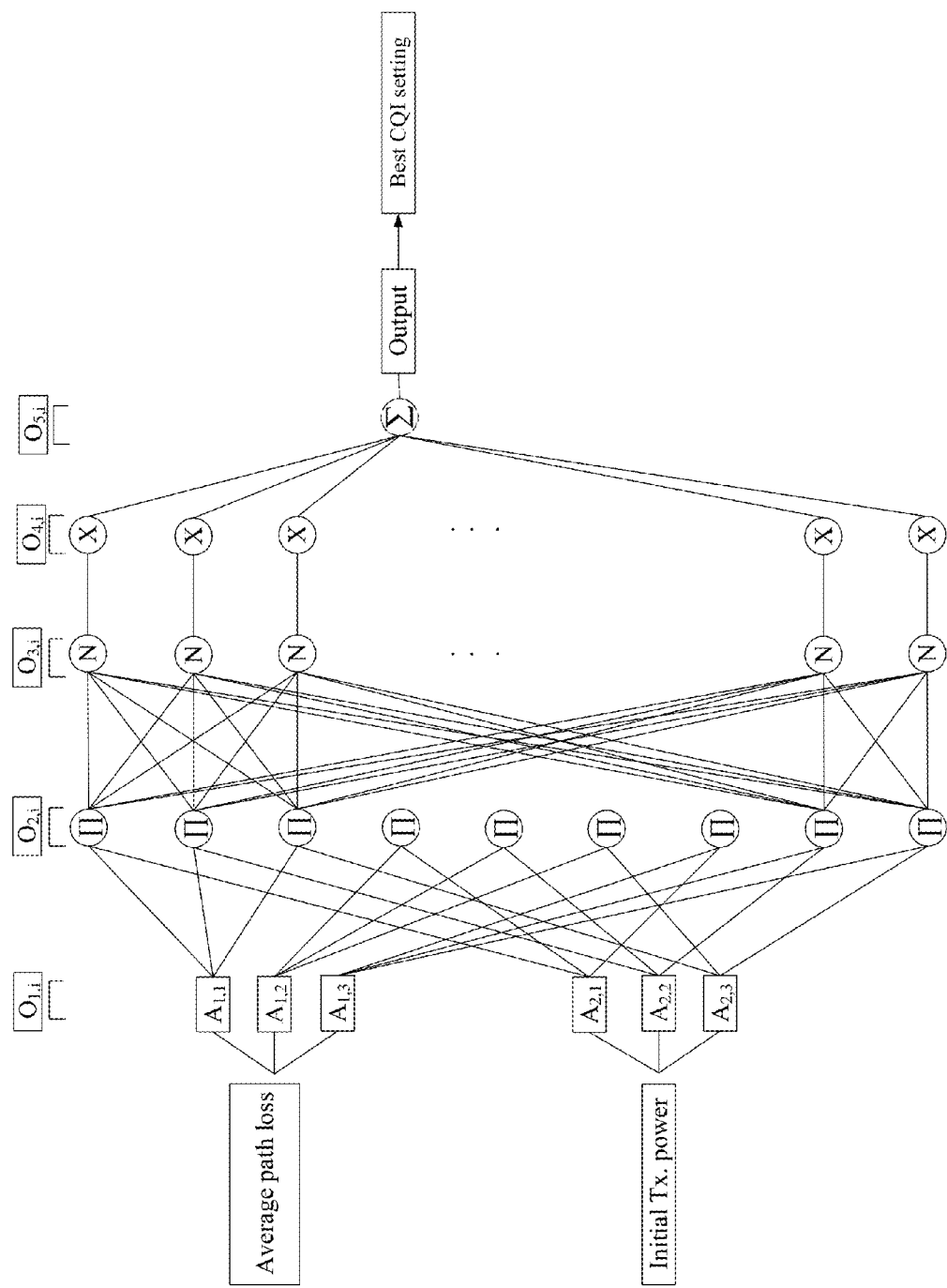
FIG. 3 shows the architecture of an ANFIS based channel quality index (CQI) decision controller (CQIDC) unit.

The architecture diagram of ANFIS based CQIDC unit is shown in FIG. 3, which contains five tiers, a total of two inputs and one output. There are two input parameters including initial power setting and path loss between orthogonal frequency division multiplexing (OFDM) transmitter and receiver. Under interference free environments, the CQIDC unit adapts the best CQI to the changing initial power setting and the measured average path loss. The Gaussian shape membership function of each input parameter is divided into three levels. There are 9 fuzzy inference rules. The CQIDC unit defines the path loss in 35 dB~45 dB for L, it defines the path loss in 46 dB~75 dB for M, it defines the path loss in 76 dB~85 dB for H; defines initial power setting in −40 dBm~−25 dBm for L, it defines initial power setting in −24 dBm~5 dBm for M, it defines the initial power setting in 6 dBm~20 dBm for H. The output is the best CQI under interference free environments.

Figure 4:
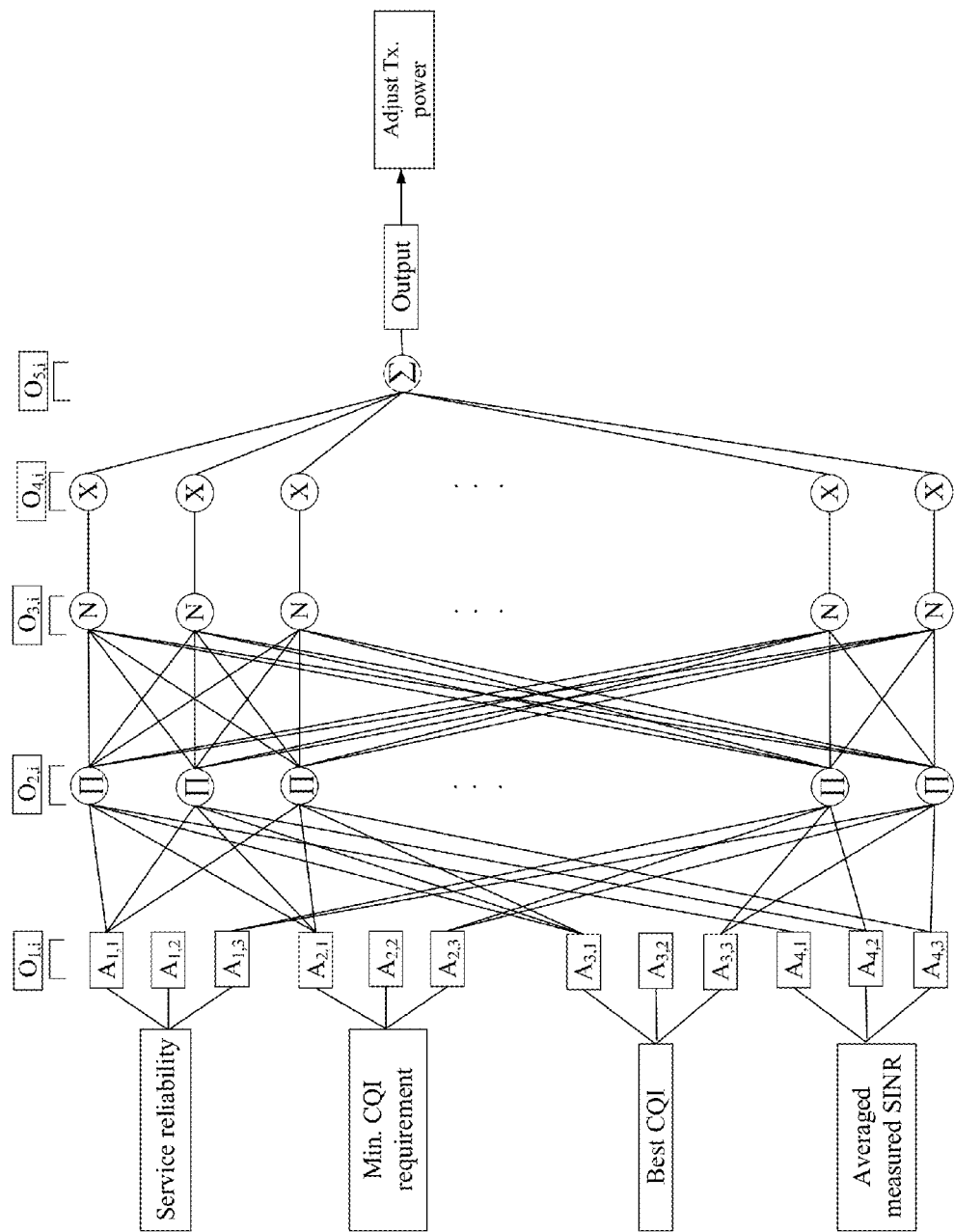
FIG. 4 shows the architecture of an ANFIS based self-optimizing power controller (SOPC) unit.

The architecture diagram of ANFIS based SOPC unit is shown in FIG. 4, which contains five tiers, a total of four inputs including SR, $CQI_{min}$, the best CQI and average measured SINR and one output. In the interference environment, the SOPC unit adapts output power increment ΔP to the changing SR, $CQI_{min}$, the best CQI and average measured SINR. The SOPC unit will be coordinated with CQIDC unit to set the minimum transmit power for the transceiver, which switches to the corresponding modulation mode and coding rate. The SOPC unit accepts four inputs and generates the optimizing minimum transmit power. The SOPC unit will continue to estimate the average SINR value in the MU interference environments. The transmit power of OFDM transceiver remains unchanged if the average SINR is higher than the threshold; the transmit power of OFDM transceiver will increase with the interference power to maintain the BLER less than $10^{-1}$ and to satisfy the requirement of SR for the UE if the average SINR is lower than the threshold and the transmit power is less than the upper bound of femtocell specification; The generalized bell shape membership function of each input parameter is divided into three levels. There are 81 fuzzy inference rules. The SOPC defines the SR of 70%~80% as low (L), it defines 81%~90% as medium (M), it defines 91%~99% as high (H); it defines the best CQI in 1~5 for L, it defines the best CQI in 6~10 for M, it defines the best CQI in 11~15 for H; it defines $CQI_{min}$ in 1~5 for L, it defines $CQI_{min}$ in 6~10 for M, it defines $CQI_{min}$ in 11~15 for H; it defines the average SINR less than −25 dB~−5 dB for L, it defines the average SINR in −4 dB~25 dB for M, it defines the average SINR 26 dB~45 dB for H. The signal-to-interference-plus-noise ratio (SINR) is estimated through the reference signal received power (RSRP) measured from the user equipment (UE) and sends back to the SODCC device in e Node B (eNB) [5]. The estimated path loss (PL) is obtained by subtracting RSRP from the transmit reference signal [6].

[5] S. Hämäläinen and H. Sanneck, LTE: *Self Organising Networks (SON): Network Management Automation for Operational Efficiency*, Wiley, Jan. 30, 2012.

[6] 3GPP Technical Specification 136.213, "Evolved Universal Terrestrial Radio Access (E-UTRA); Physical layer procedures" (Release 8), www.3gpp.org.

The SOPC unit is used as an example to describe the framework of the ANFIS controller:

Layer 1: The generalized bell shape membership functions are defined as $$A_{j,n}(x_{j,m}) = \frac{1}{1 + \left|\frac{x_{j,m} - c_{j,n}}{a_{j,n}}\right|^{2b_{j,n}}}, \quad (1)$$

for $n = 1, 2, 3$ and $j = 1, 2, 3, 4$ where $x_{j,m}$ is the $m_{th}$ input and the premise parameters $a_{j,n}$, $b_{j,n}$, $c_{j,n}$ pertaining to the node outputs are updated according to given training data and the steepest descent approach.

Layer 2: The output of node i, denoted by $O_{2,i}$, is the product of all the incoming signals for the ith rule. It is given by $$w_{i,m} = O_{2,i} = A_{1,p}(x_{1,m}) \times A_{2,q}(x_{2,m}) \times A_{3,r}(x_{3,m}) \times A_{4,s}(x_{4,m}). \quad (2)$$

for i=1, 2 . . . , 81; p=1, 2, 3; q=1, 2, 3; r=1, 2, 3; s=1, 2, 3

Layer 3: The output of node i, denoted by $O_{3,i}$, is called the normalized firing strength and calculated as $$O_{3,i} = \hat{w}_{i,m} = \frac{w_{i,m}}{\sum_{i=1}^{81} w_{i,m}}, \text{ for } i = 1 \sim 81 \quad (3)$$

Layer 4: Every node in the fourth layer is an adaptive node with a node function $$O_{4,i} = \hat{w}_{i,m} \times f_{i,m} = \hat{w}_{i,m} \times (\alpha_i x_{1,m} + \beta_i x_{2,m} + \gamma_i x_{3,m} + \lambda_i x_{4,m} + \sigma_i); \quad (4)$$

for i=1~81 where $O_{4,i}$ is the node output, $f_{i,m}$ is a crisp output in the consequence, and the $\alpha_i, \beta_i, \gamma_i, \sigma_i, \lambda_i$ are the consequent parameters of node i. The 81 fuzzy inference rules of $f_{i,m}$ are constructed as follows:

$R_1$ If $(x_{1,m}$ is $A_{11})$ and $(x_{2,m}$ is $A_{21})$ and $(x_{3,m}$ is $A_{31})$ and $(x_{4,m}$ is $A_{41})$ then (output is $f_{1,m}$)

$R_2$ If ($x_{1,m}$ is $A_{11}$) and ($x_{2,m}$ is $A_{21}$) and ($x_{3,m}$ is $A_{31}$) and ($x_{4,m}$ is $A_{42}$) then (output is $f_{2,m}$)

$R_3$ If ($x_{1,m}$ is $A_{11}$) and ($x_{2,m}$ is $A_{21}$) and ($x_{3,m}$ is $A_{31}$) and ($x_{4,m}$ is $A_{43}$) then (output is $f_{3,m}$)

.

.

.

$R_{80}$ If ($x_{1,m}$ is $A_{14}$) and ($x_{2,m}$ is $A_{24}$) and ($x_{3,m}$ is $A_{34}$) and ($x_{4,m}$ is $A_{43}$) then (output is $f_{80,m}$)

$R_{81}$ If ($x_{1,m}$ is $A_{14}$) and ($x_{2,m}$ is $A_{24}$) and ($x_{3,m}$ is $A_{34}$) and ($x_{4,m}$ is $A_{44}$) then (output is $f_{81,m}$) (5)

The above 81 fuzzy inference rules are used for determining the assigned data rate to achieve optimization objective.

Layer 5: The single node in the fifth layer is a fixed node labeled $\Sigma$, which computes the overall output $O_5$ as the summation of all incoming signals.

$$G_m = O_5 = \sum_{i=1}^{81} \hat{w}_{i,m} \times f_{i,m} \quad (6)$$

Figure 5:
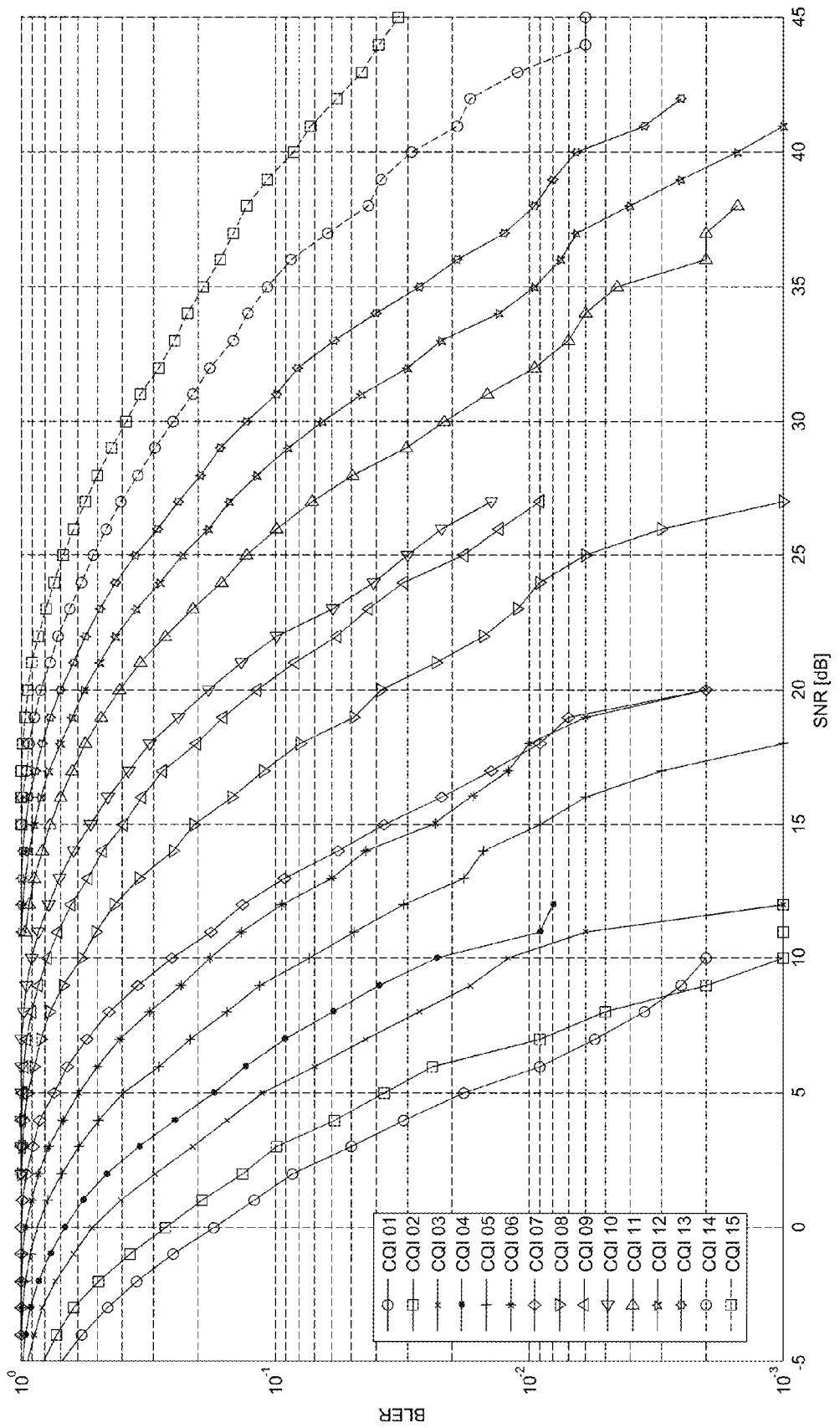
FIG. 5 illustrates the BLER performance of DL transceiver in IOA channel for CQI=1, 2 . . . , 15.

(A) Initial Power Setting Controller (IPSC) Unit:

In order to control the initial power of small cell eNB for satisfying the requirements of the UE, the blocking error rate (BLER) performance of the LTE downlink (DL) transceiver is simulated to generate the training data for the IPSC. The system parameters are shown in Table 1 and fundamental parameters of the transceiver are shown in Table 2. In the simulation of the present embodiment, for the different channel quality index (CQI), the BLER of 1×1 SISO-OFDM transceiver is simulated where the system bandwidth is 10 MHz, the indoor office A (IOA) is selected as channel model [7], the LS channel estimation and MMSE equalizer are used, and user speed is assumed to be 10 Km/hr. The 1000 sub frames are applied for the simulations. The results are shown in FIG. 5, which is used as a training data to define the SNR threshold value, i.e. minimum SINR, (as shown in Table 3) of different CQI for BLER=$10^{-1}$. In each CQI (corresponding to each pair of modulation and code rate mode), the difference between the SINR measurement value and the SINR threshold value is used to control the size of the transmit power increment $\Delta P$, which must compliance with the provisions of Table 3, where the interference power is not considered.

Figure 6:
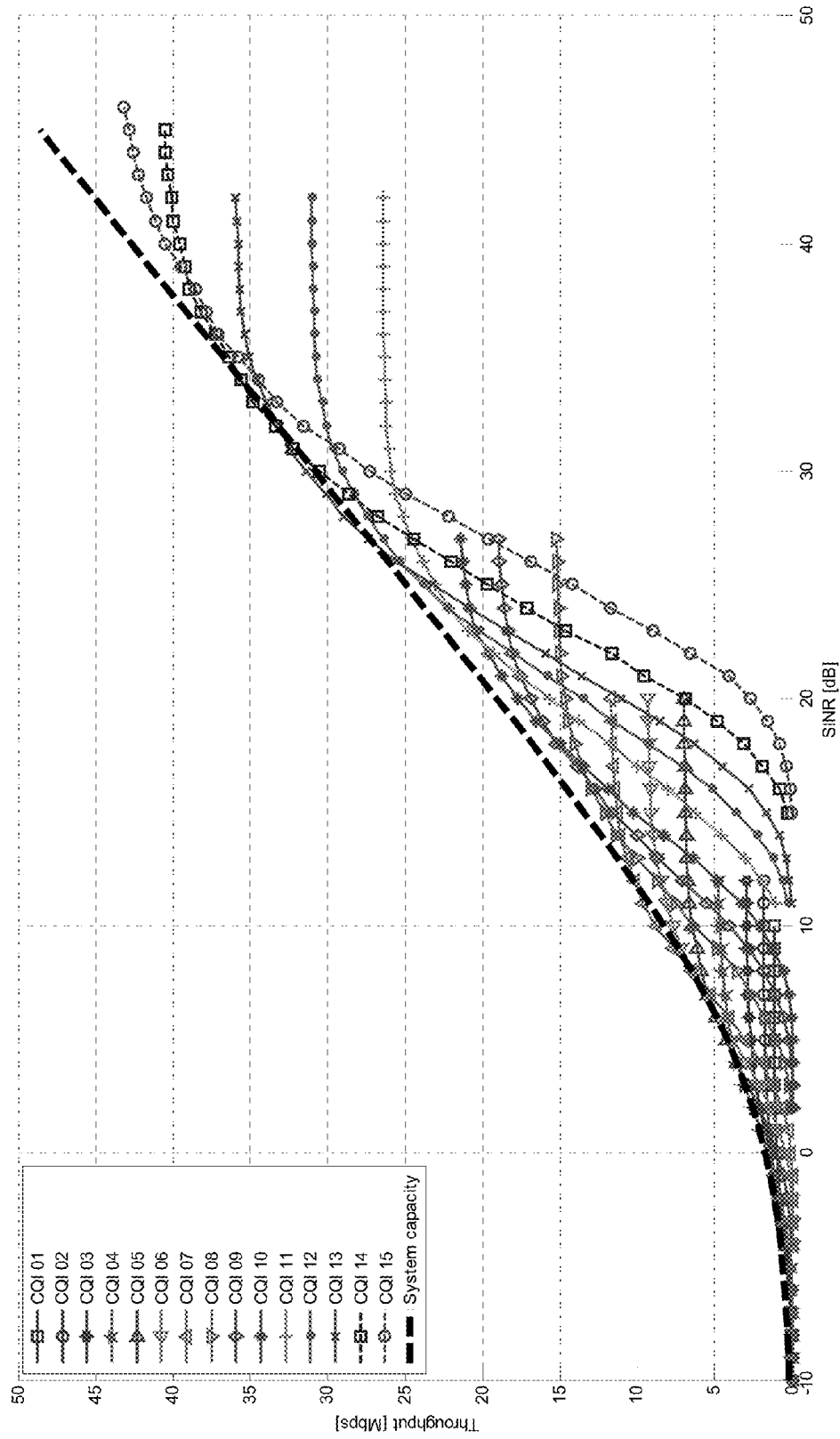
FIG. 6 illustrates average throughput and system capacity of DL transceiver in IOA channel for CQI=1, 2 . . . , 15.

When the system bandwidth is 10 MHz, the corresponding total number of physical resource blocks (PRBs) is 50 PRBs. The resource assignment method of this invention is the time division multiplexing access (TDMA) for the MUs. The eNB of the indoor office will perform the resource allocation for each UE with 50 RBs at each time instant. For practical implementation considerations, the system capacity of the downlink (DL) OFDM transceiver formula is modified as [8]

$$C(bps) = BW \cdot BW\_eff \cdot \eta \cdot \log_2(1+SINR/SINR\_eff) \quad (7)$$

where BW and BW_eff are system bandwidth and effective system bandwidth, respectively. The parameter $\eta$ is a correction factor. SINR and SINR_eff are signal to interference plus noise power ratio and effective signal to interference plus noise power ratio, respectively. In this invention, the simulation parameters of DL SISO OFDM transceiver is given in Table 2, where BW=10 MHz, BW_eff=0.83, $\eta$=0.43 and SINR_eff=2.51. The average throughput of DL transceiver in IOA channel for CQI=1, 2 . . . , 15 is shown in FIG. 6, where the system capacity is denoted by dotted curve and the simulated average throughput for CQI=1, 2 . . . , 15 are denoted by solid curve. It is observed that the simulated average throughput approximates to the Shannon capacity bound for LTE specifications. Thus, the throughputs corresponding to SINR threshold for the different CQIs are calculated with (7) and listed in Table 3. As can be seen from table, the input throughput requirement settings in the range of 3.1~4.2 Mbps, 10.3~11.3 Mbps, and 19.8~21.4 Mbps correspond to the cell edge CQI ($CQI_{min}$) in 3, 7, and 10, respectively.

This invention considers multi-user SR requirements of indoor small cell fading environments. The received signal strength $P_r$ at the UE is log-normally distributed. The coverage probability of $P_r$ greater than the threshold $P_{r,min}$ from the femtocell to a UE at the distance d is $$P_{W_0}(d) = p[P_r \geq P_{r,min}] = \int_{P_{r,min}}^{\infty} p(W)dW \quad (8)$$

$$= \frac{1}{2} - \frac{1}{2}\mathrm{erf}\left(\frac{P_{r,min} - K + 10N\log\left(\frac{d}{R}\right)}{\sqrt{2}\,\sigma_W}\right)$$

where R is the femtocell radius, K is the average signal strength (dBm) at the cell edge (d=R), K–$P_{r,min}$ (dB) is the fade margin (FM) at the cell edge which is used to guarantee the reliability at the cell edge, $\sigma_w$ is the standard deviation of received signal strength (dB) and N is the path loss exponent.

The percentage of the UE in a cell of radius R for $P_r$ greater than the receiver threshold $P_{r,min}$ is defined as the system reliability (SR), which is given as [9]

$$SR = \frac{1}{2}\left\{1 + \mathrm{erf}(p) + \exp\left(\frac{2pq+1}{q^2}\right)\left[1 - \mathrm{erf}\left(\frac{pq+1}{q}\right)\right]\right\}. \quad (9)$$

where $$p = \frac{FM}{\sqrt{2}\,\sigma_W}, \quad q = \frac{10N\log_{10}e}{\sqrt{2}\,\sigma_W}, \quad (10)$$

The minimum transmit power of the IPSC is evaluated by link budget formula for the different SR, coverage radius (R) of indoor office, and the cell edge CQI ($CQI_{min}$) requested by the UE. The minimum transmit power in dBm of the IPSC is given by $$P_{ini} = P_{r,min}(CQI_{min}) + L_t - G_t + PL(R) + FM(SR) - G_r + L_r \quad (11)$$

where $P_{r,min}(CQI_{min})$ is the receiver sensitivity for the requirement of edge CQI ($CQI_{min}$). $L_t$ denotes the cable loss in dB. $G_t$ and $G_r$ are the antenna gains in dBi of the femtocell and th target UE, respectively. PL(R) denotes the maximum path loss between a femtocell and an UE at the cell edge. $L_r$ in dB is the body loss of the UE. FM denotes fade margin in dB corresponding to different SR set by the UE.

The receiver sensitivity for the requirement of the given transceiver edge CQI ($CQI_{min}$) in a given cell is obtained by $$P_{r,min}(CQI_{min}) = P_N + SNR_{th}(CQI_{min}) \quad (12)$$

where the receiver noise power $P_N$ in dBm is given as $$P_N = NF \text{ (dB)} + (-174) + 10 \log_{10}(BW_r) \text{ (dBm)} \tag{13}$$

where NF is the noise figure of the UE receiver and $BW_r$ is the receiver bandwidth. $SNR_{th}(CQI_{min})$ denotes the SNR threshold of the receiver for different $CQI_{min}$, which is generated from the performance simulations using the transceiver specification listed in Table 2. The SNR thresholds for BLER=0.1 are summarized in Table 3. Using the ITU-R indoor path loss model [10], the path loss between a femtocell and an UE separated by a distance d in a given cell is $$PL(d) = 20 \log_{10}(f) + 10N \log_{10}(d) + L_f(n) - 28 \text{ (dB)} \tag{14}$$

where d(m) is the distance between a femtocell eNB and an UE in a given cell. $f$(MHz) is the carrier frequency. N is the path loss exponent, where the nominal value in the indoor office is set as 3. $L_f(n)$ (dB) is the penetration loss between the floors, where n is the number of floors. The penetration loss is not considered in the simulations. In addition, the standard deviation $\sigma_w$ of the received shadow fading signal power in the indoor office environment is set as 10 dBm [10]. Thus, the FM value corresponding to different SR can be calculated by (9) and listed in Table 4.

Figure 7:
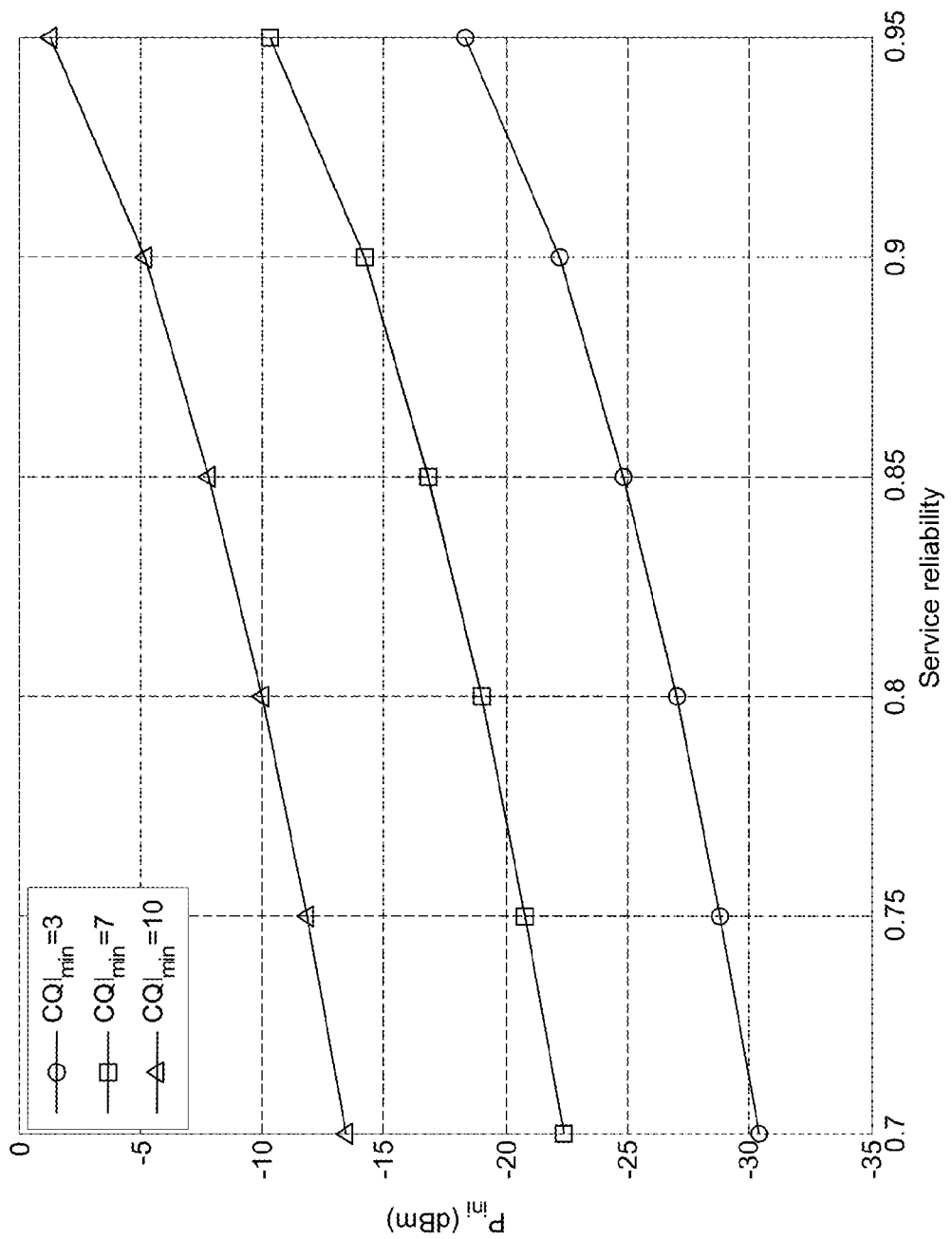
FIG. 7 shows a set of training data for IPSC unit: Minimum transmit power corresponding to coverage radius of 5 m, cell edge CQI of 3, 7, 10, SR=70%, 75%, 80%, 85%, 90%, 95%.

The training data of the IPSC is generated from the simulation results of the transceiver BLER, as shown in Table 3. Integrating Table 3 with equations (9), (10), (11), (12), (13) and (14), the minimum transmit power is calculated for different coverage radius (2.5, 5, 7.5, 10, 12.5 and 15 meters), service reliability (70%, 75%, 80%, 85%, 90% and 95%) and cell edge CQI (1~15). FIG. 7 shows a set of training data of the IPSC for coverage radius of 5 meter, cell edge CQI (3, 7, 10) and different service reliability (70%, 75%, 80%, 85%, 90% and 95%). For example, when $CQI_{min}$ is 7, the minimum transmit power corresponding to different service reliability (70%, 75%, 80%, 85%, 90% and 95%) is (−22.43 dBm, −20.83 dBm, −19.03 dBm, −16.83 dBm, −14.23 dBm and −10.33 dBm).

The function of the IPSC is to set the initial minimum transmit power of the femtocell eNB, which satisfies the requirements of the different SR, coverage radius (R) of indoor office, and the cell edge CQI ($CQI_{min}$) requested by the UE in the interference free environments. Each input uses three generalized bell shape membership functions (MFs), which are defined as $$A_{j,n}(x_{j,m}) = \frac{1}{1 + \left|\frac{x_{j,m} - c_{j,n}}{a_{j,n}}\right|^{2b_{j,n}}}, \tag{15}$$

for $n = 1, 2, 3$ and $j = 1, 2, 3$ where $x_{j,m}$ is the $m_{th}$, input and the premise parameters $a_{j,n}$, $b_{j,n}$, $c_{j,n}$ pertaining to the node outputs are updated according to given training data and the steepest descent approach. The 27 fuzzy inference rules are constructed in Table 5. A minimum transmit power optimization problem of the ANFIS-IPSC is formally formulated as follows:

Optimize $P_{ini} = f(\vec{x})$, $f(\vec{x})$ is the objective function; subject to:

$$\vec{x} \in \{R_m, SR_m, CQI_{min,m}\}$$

$$0 \text{ m} \leq R \leq 15 \text{ m}$$

$$70\% \leq SR \leq 99\%$$

$$1 \leq CQI_{min} \leq 15$$

$$P_{ini} \in \{\leq 20 \text{ dBm}\} \tag{16}$$

Figure 8A:
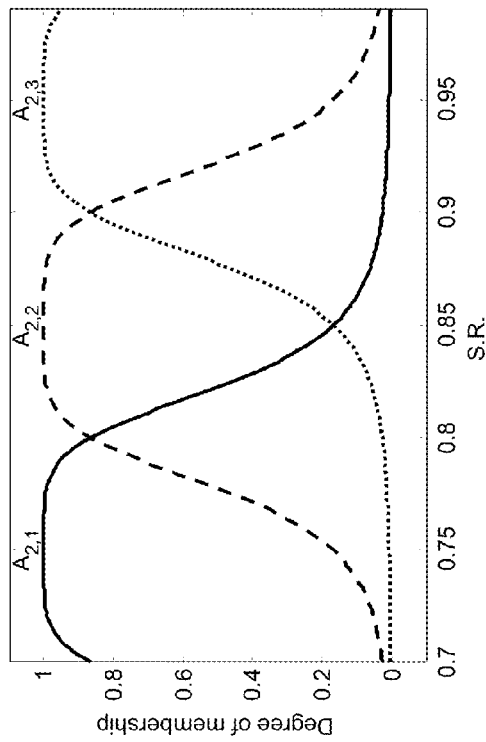
FIG. 8(a) shows initial coverage radius (R) membership functions of IPSC unit.
Figure 8B:
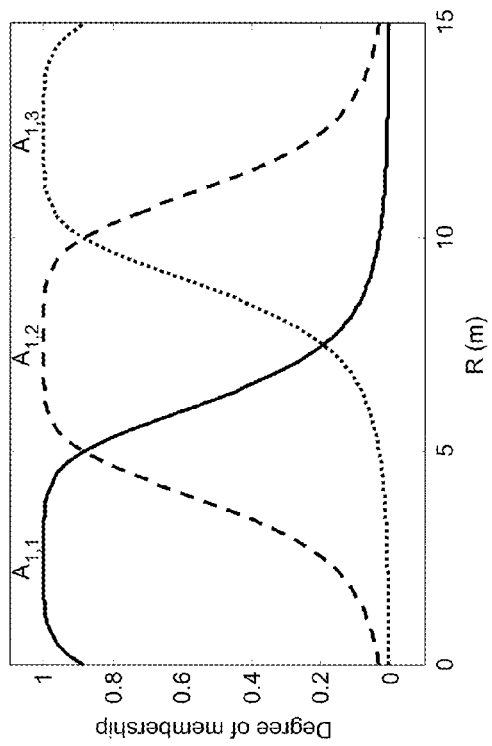
FIG. 8(b) shows initial service reliability (SR) membership functions of IPSC unit.
Figure 8C:
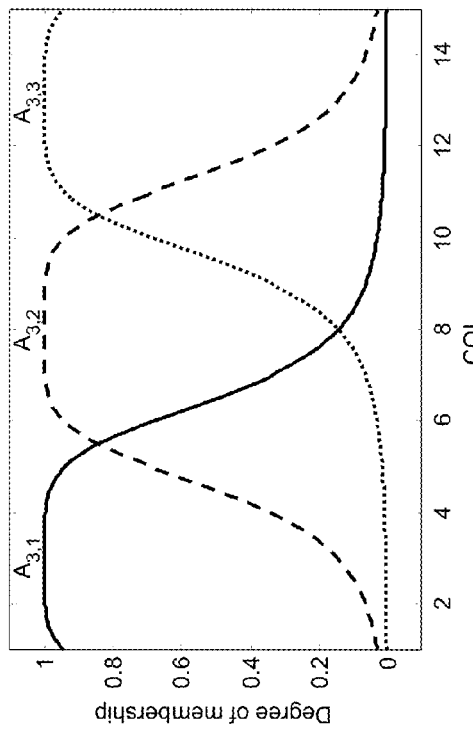
FIG. 8(c) shows initial cell edge CQI ($CQI_{min}$) membership functions of IPSC unit.
Figure 9B:
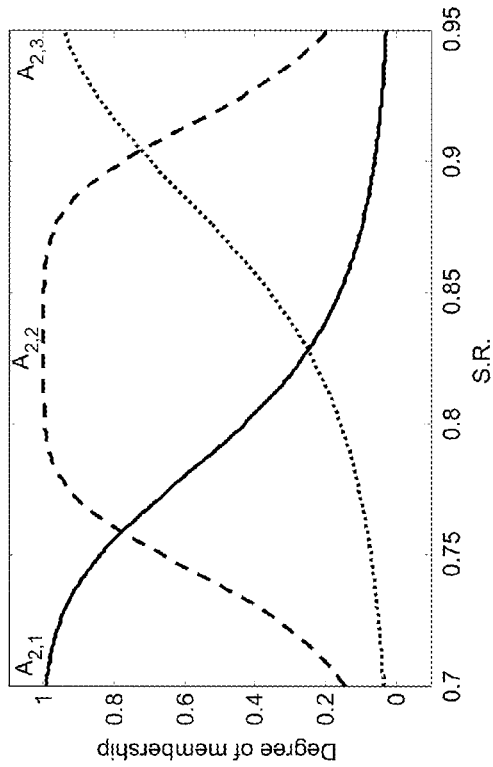
FIG. 9(b) shows learned service reliability (SR) membership functions of IPSC unit.
Figure 9A:
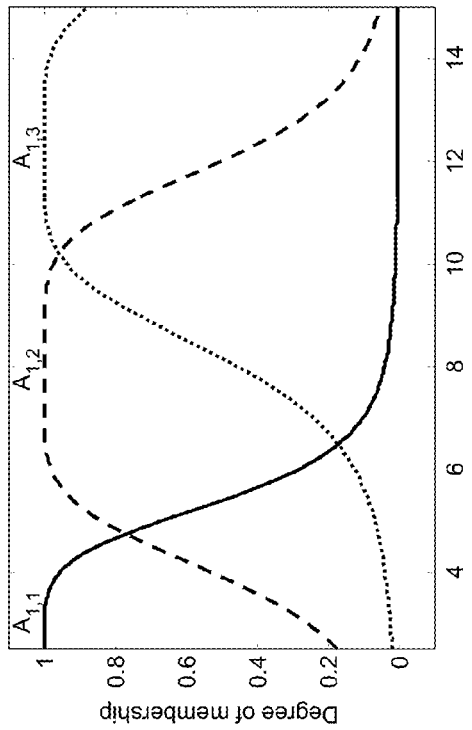
FIG. 9(a) shows learned coverage radius (R) membership functions of IPSC unit.
Figure 9C:
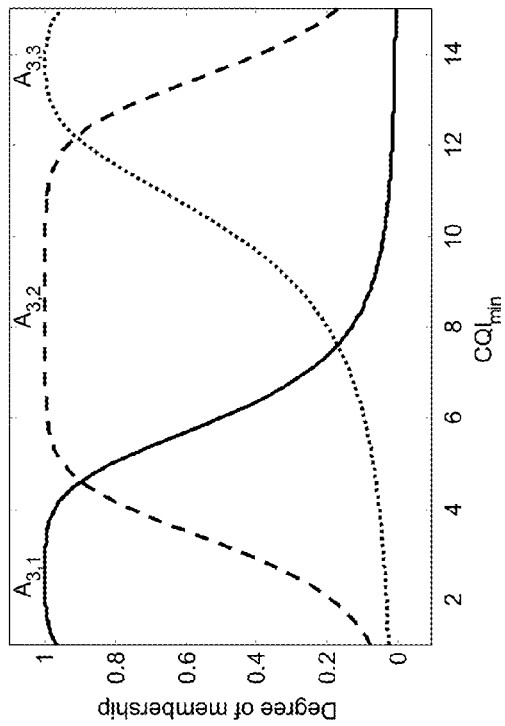
FIG. 9(c) shows learned cell edge CQI ($CQI_{min}$) membership functions of IPSC unit.
Figure 10:
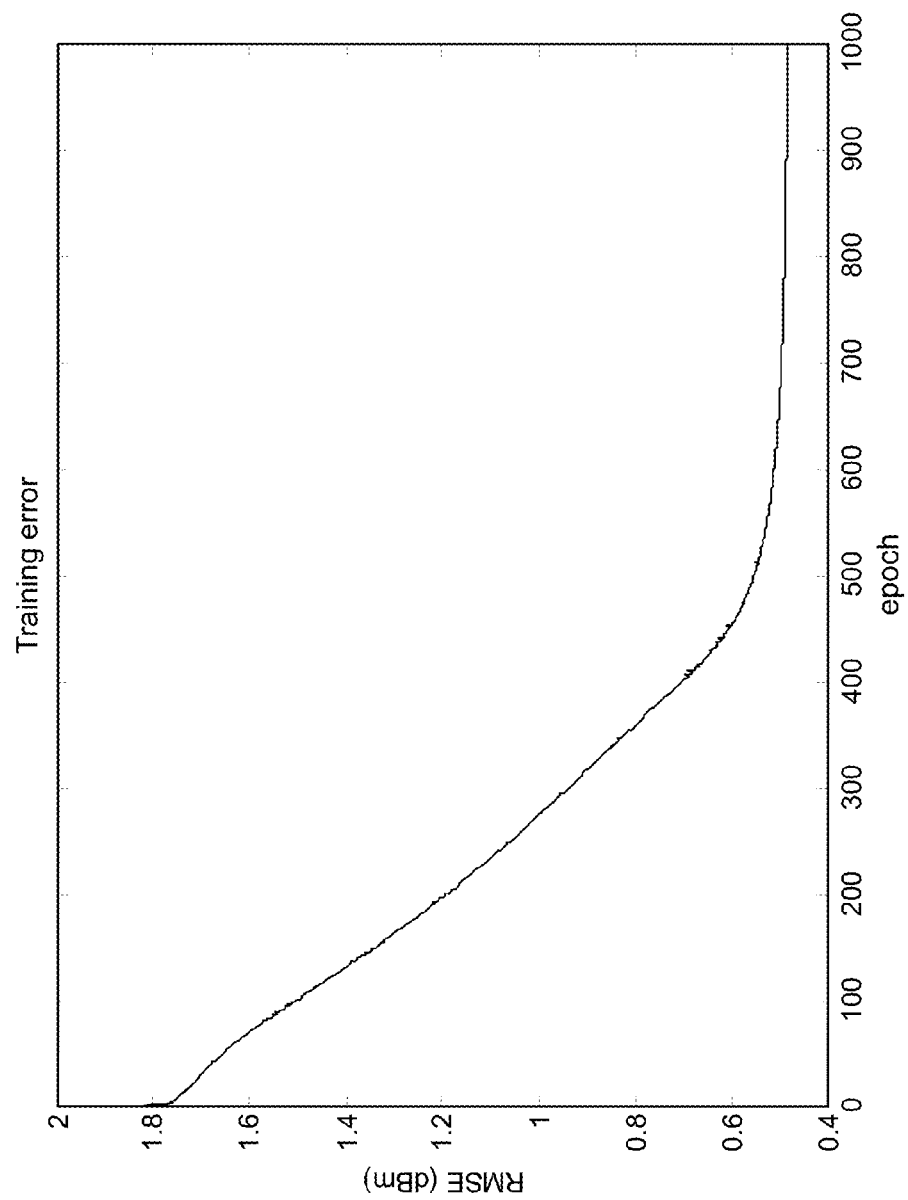
FIG. 10 shows root mean square error of IPSC unit.

The premise parameters of three MFs before and after training are shown in FIG. 8 and FIG. 9, respectively. The root mean square error (RMSE) curve of the IPSC is shown in FIG. 10, which demonstrates that the RMSE converges to 0.48 dBm after 800 epochs.

[7] ITU-R, Recommendation ITU-R M.1225, GUIDELINES FOR EVALUATION OF RADIO TRANSMISSION TECHNOLOGIES FOR IMT-2000, 1997

[8] Mogensen, P., et al, "LTE Capacity compared to the Shannon Bound", Vehicular Technology Conference, 2007. VTC2007-Spring. IEEE 65th, pp. 1234-1238, April 2007.

[9] Wiliam C. Jakes, Jr., Microwave Mobile Communications, 1974.

[10] ITU-R, Recommendation ITU-R P.1238-7 (February 2012) Propagation data and prediction methods for the planning of indoor radio communication systems and radio local area networks in the frequency range 900 MHz to 100 GHz, February 2012.

(B) Channel Quality Index Decision Controller (CQIDC) Unit:

In the real radio channel environment, indoor small cell base station deployment will face co-channel interference of macro cell base station or neighboring small cell, resulting in performance degradation of indoor small cell base station. Therefore, the CQIDC unit in the SODCC device determines the best CQI in interference-free environment to meet the receiver performance of BLER≤0.1. Further, in interference environments, self-optimizing power system control unit (SOPC) keeps track of the measured SINR to self-optimize the transmit power, enabling the UE to meet the objective needs of the service's reliability and minimum transmit power.

In the interference free environment, in order to determine the best CQI ($CQI_{best}$) at different UE's locations of indoor office, the following formula is used to estimate signal-to-noise-power ratio (SNR). It can be expressed as $$SNR = P_r(W)/P_N(W) \tag{17}$$

where the average received power $P_r$ in the interference free environment is given as $$P_r = P_{ini} - L_t + G_t - \overline{PL} + G_r - L_r \tag{18}$$

where $\overline{PL}$ denotes the measured average path loss between a femtocell and an UE in the given cell. The noise power $P_N$ can be calculated by (13). Then, the best CQI in the interference free environment is determined by the following rules:

$$CQI_{best} = \begin{cases} CQI\_i, & \text{if } SNR_{th}(CQI\_i) \leq SNR < SNR_{th}(CQI\_i + 1), i = 1 \sim 14 \\ CQI\_15, & \text{if } SNR \geq SNR_{th}(CQI\_15) \\ CQI\_1, & \text{if } SNR < SNR_{th}(CQI\_1) \end{cases} \tag{19}$$

Figure 11:
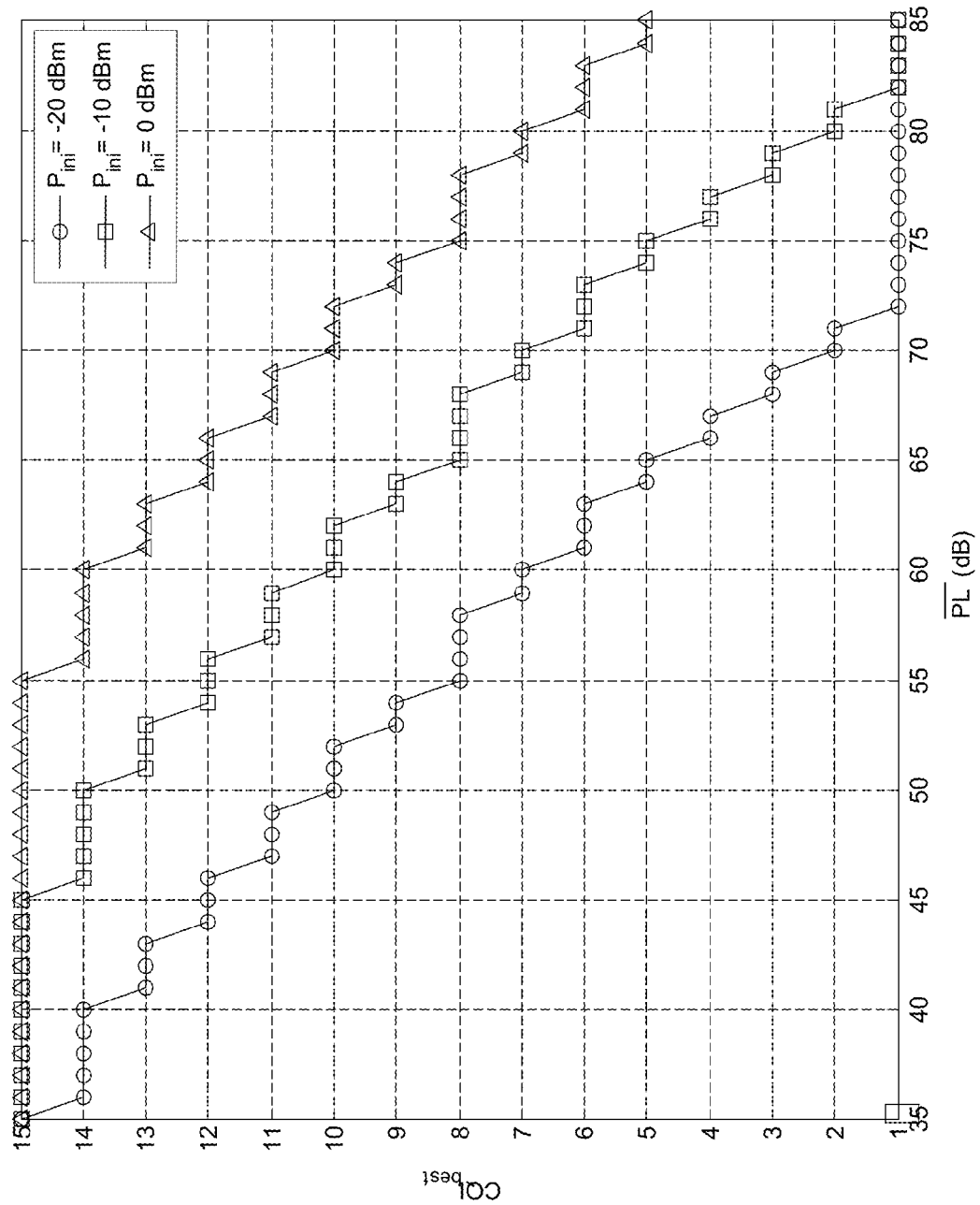
FIG. 11 shows a set of training data for CQIDC unit: The best CQI corresponding to IPSC=−20 dBm, −10 dBm, 0 dBm, average path loss=35 dB to 85 dB.

The training data of the CQIDC is generated from the simulation results of the transceiver BLER, as shown in Table 3. Integrating Table 3 with equations (17), (18) and (19), the best CQI is calculated for different measured average path loss (35 dB~85 dB) and initial minimum transmit power (−40 dBm~20 dBm). FIG. 11 shows a set of CQIDC training data for the best CQI corresponding to the different average path loss (35 dB~85 dB) for three initial minimum transmit power (−20 dBm, −10 dBm, 0 dBm). It is observed that the best CQI will increase as the path loss becomes smaller, and at the same average path loss, the best CQI increases as the initial transmit power becomes larger.

The function of the CQIDC is to determine the best CQI of the femtocell at different UE's locations of indoor office, which satisfies the receiver performance of BLER≤0.1 in the interference free environments. Each input uses three Gaussian MFs, which are defined as $$A_{j,n}(x_{j,m}) = e^{\frac{-(x_{j,m}-b_{j,n})^2}{2\sigma_{j,n}^2}}, \text{ for } n = 1, 2, 3 \text{ and } j = 1, 2 \quad (20)$$

1. where $x_{j,m}$ is the $m_{th}$ input and the premise parameters $a_{j,n}$, $b_{j,n}$ pertaining to the node outputs are updated according to given training data and the steepest descent approach. The 9 fuzzy inference rules of $f_{i,m}$ are constructed in Table 6. The output of CQIDC is the best CQI of the femtocell at different UE's locations of indoor office. An optimization problem of the best CQI of the ANFIS-CQIDC is formally formulated as follows:

In the interference free environments, BLER≤0.1, optimize $CQI_{best,m} = f(\vec{x})$, $f(\vec{x})$ is the objective function; subject to:

$\vec{x} \in \{\overline{PL_m}, P_{ini,m}\}$ 35 dB≤$\overline{PL}$≤85 dB

−40 dBm<$P_{inin}$≤20 dBm $CQI_{best} \in \{1-15\}$ (21)

Figure 12A:
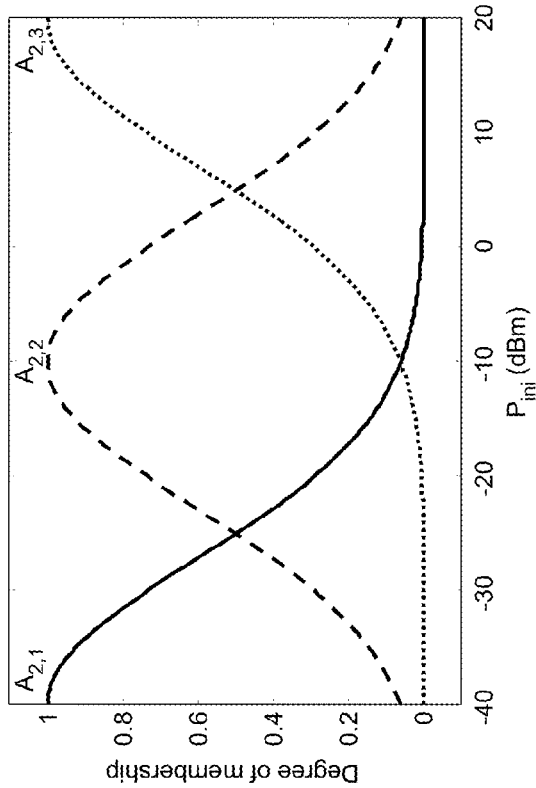
FIG. 12(a) shows initial average path loss ($\overline{PL}$) membership functions of CQIDC unit.
Figure 12B:
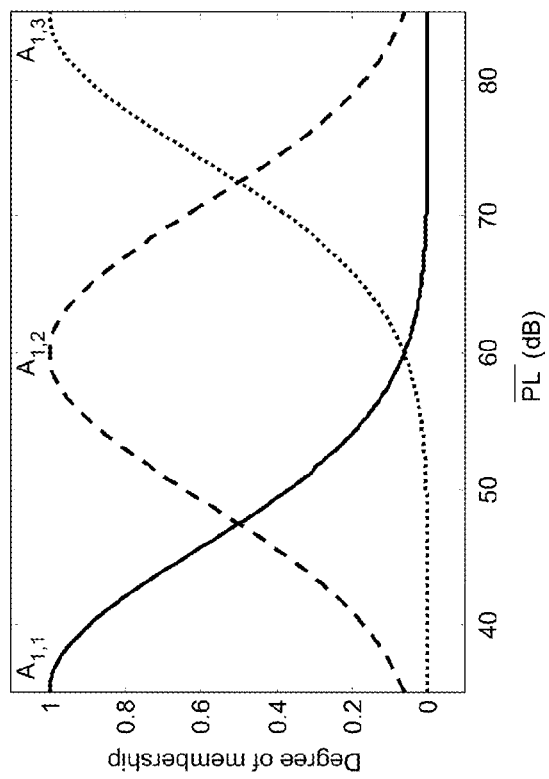
FIG. 12(b) shows initial transmit power initialization ($P_{ini}$) membership functions of CQIDC unit.
Figure 13B:
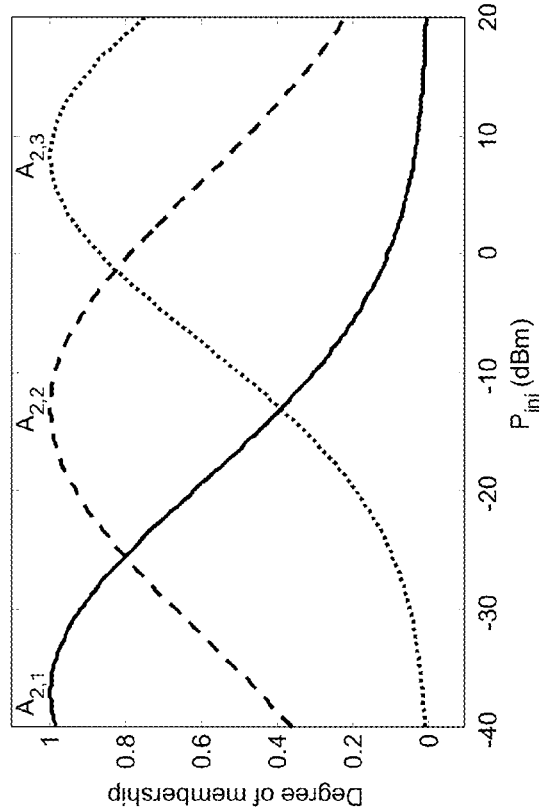
FIG. 13(b) shows learned transmit power initialization ($P_{ini}$) membership functions of CQIDC unit.
Figure 13A:
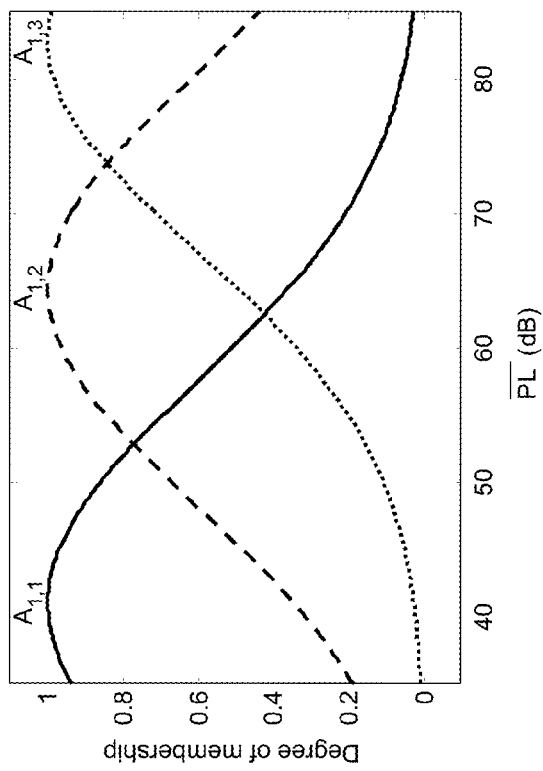
FIG. 13(a) shows learned average path loss ($\overline{PL}$) membership functions of CQIDC unit.
Figure 14:
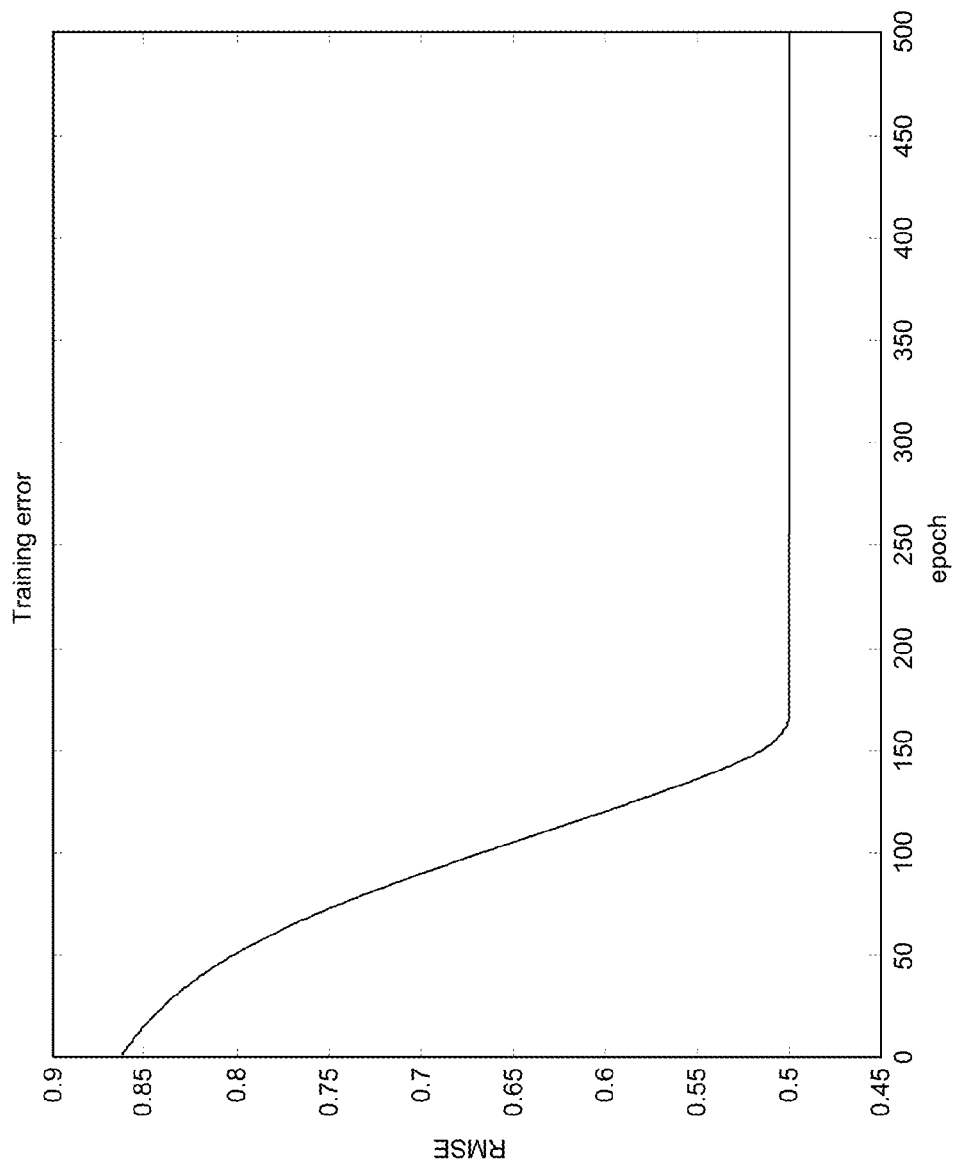
FIG. 14 shows root mean square error of CQIDC unit.

The premise parameters of three MFs before and after training are shown in FIG. 12 and FIG. 13, respectively. The root mean square error (RMSE) curve of the CQIDC is shown in FIG. 14, which demonstrates that the RMSE converges to 0.49 after 170 epochs.

(C) Self-Optimizing Power Control (SOPC) Unit:

The SOPC unit adapts output power increment ΔP to the changing SR, $CQI_{min}$ and cell radius set by user demand, the best CQI and measured SINR, so that the femtocell in the interference environment not only can still meet the demands set by the UE and communication quality, but also self-optimizing the minimum transmit power of eNB, thereby reducing the co-channel interference to the neighboring cells.

For the purpose of satisfying the requirements of BLER≤10% and the requested SR, the signal to interference plus noise ratio (SINR) is defined as $SINR_{th} = \max\{SNR_{th}(CQI_{min}) + FM(SR), SNR_{th}(CQI_{best})\}(dB)$ (22)

The output power increment (ΔP) is given as $\Delta P = SINR_{th} - \overline{SINR}(dB)$ (23)

where $\overline{SINR}$ is the measured average SINR sent from the UE.

Figure 15:
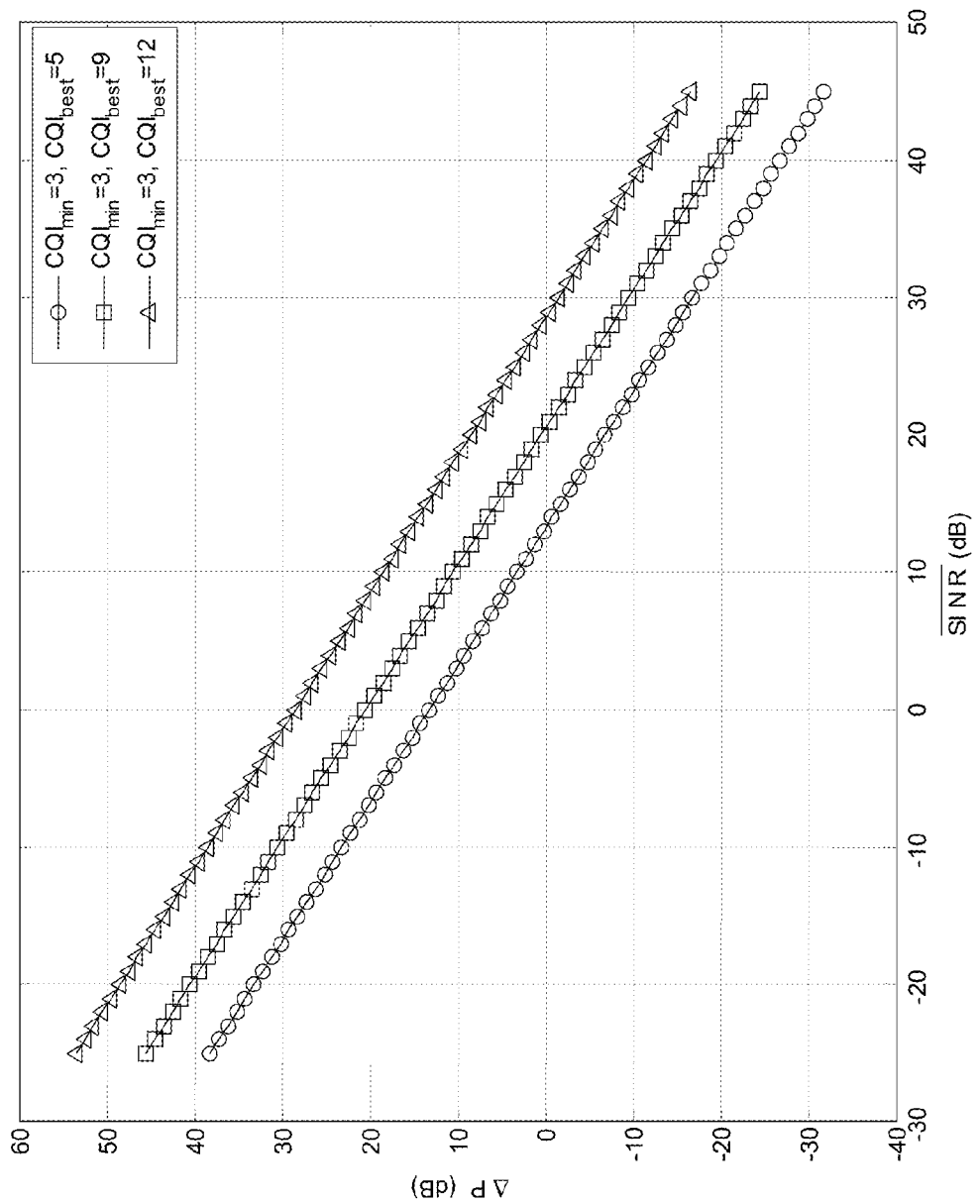
FIG. 15 shows a set of training data for SOPC unit: The optimum power adjustment corresponding to SR=70%, $CQI_{min}$=3, the best CQI=5, 9, 12, and different average measured SINR.
Figure 16A:
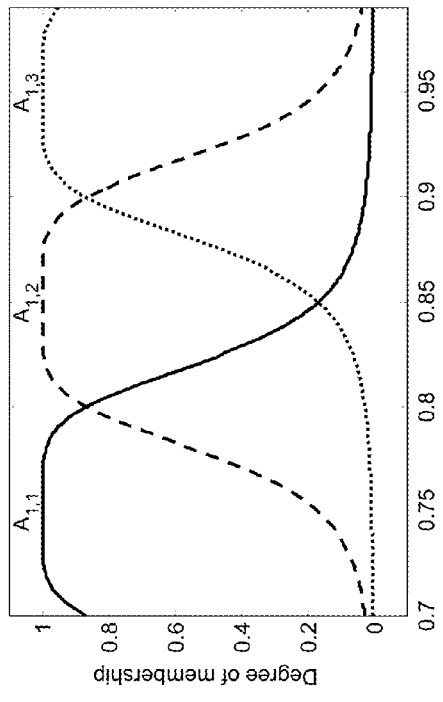
FIG. 16(a) shows initial service reliability (SR) membership functions of SOPC unit.
Figure 16B:
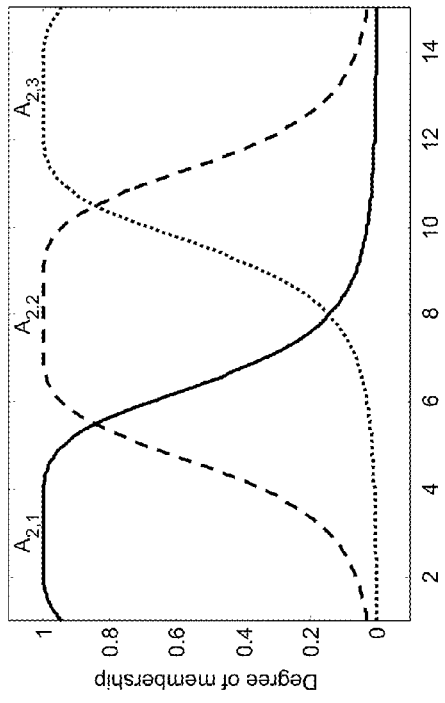
FIG. 16(b) shows initial cell edge CQI ($CQI_{min}$) membership functions of SOPC unit.
Figure 16C:
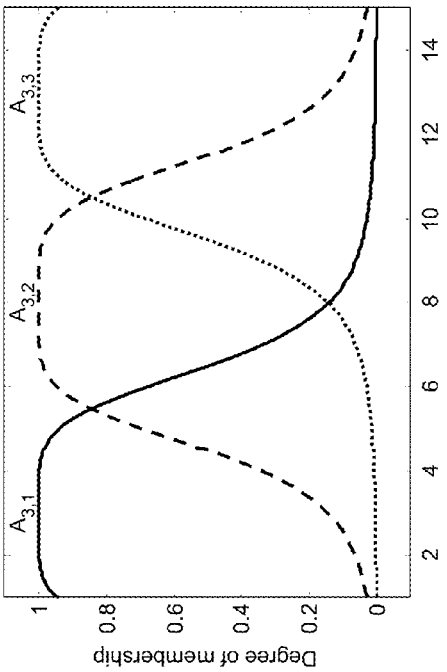
FIG. 16(c) shows initial best CQI ($CQI_{best}$) membership functions of SOPC unit.
Figure 16D:
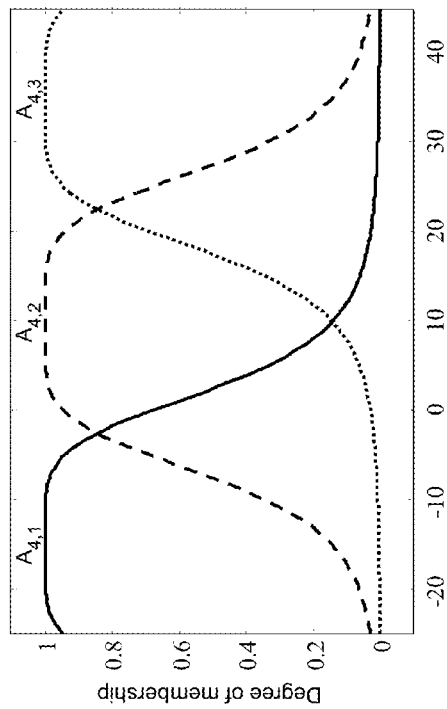
FIG. 16(d) shows initial measured average SINR ($\overline{SINR}$) membership functions of SOPC unit.
Figure 17B:
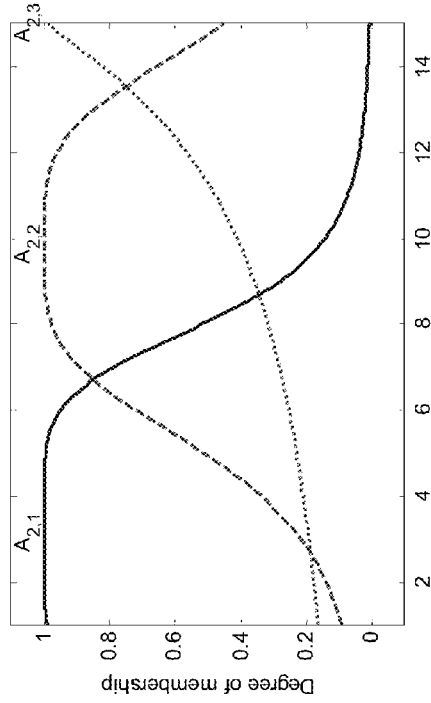
FIG. 17(b) shows learned cell edge CQI ($CQI_{min}$) membership functions of SOPC unit.
Figure 17D:
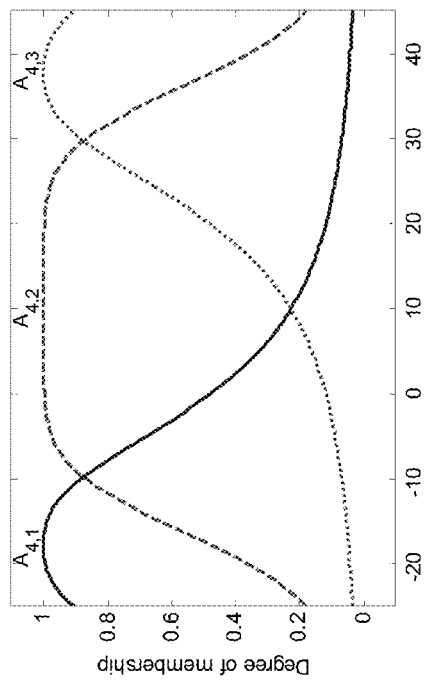
FIG. 17(d) shows learned measured average SINR ($\overline{SINR}$) membership functions of SOPC unit.
Figure 17A:
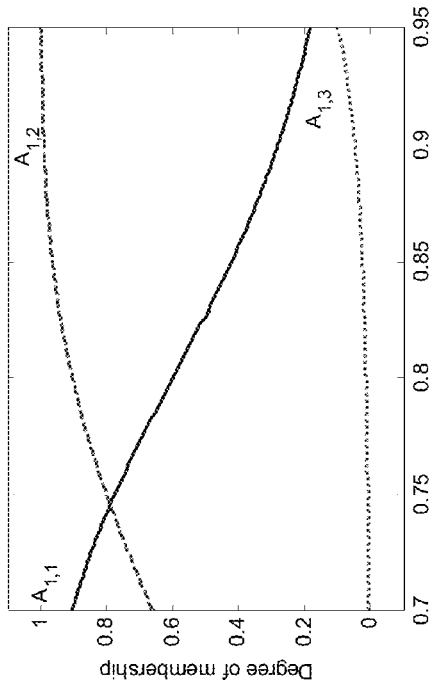
FIG. 17(a) shows learned service reliability (SR) membership functions of SOPC unit.
Figure 17C:
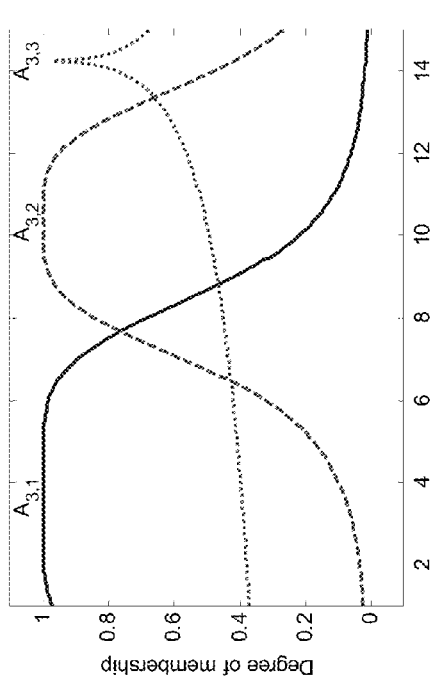
FIG. 17(c) shows learned best CQI ($CQI_{best}$) membership functions of SOPC unit.

The training data of the SOPC unit is generated from the simulation results of the single input single output (SISO) transceiver BLER, as shown in Table 3. The fundamental specification of the SISO transceiver is listed in Table 2. Integrating Table 2, Table 3 with equations (22) and (23), the increment of the minimum transmit power is calculated for different coverage radius (2.5, 5, 7.5, 10, 12.5 and 15 meters), service reliability (70%, 75%, 80%, 85%, 90% and 95%), cell edge CQI (1~15), measured average SINR (−25 dB~45 dB) and the best CQI (1~15) in the interference free environments. FIG. 15 shows a set of SOPC training data for the transmit power increment corresponding to the different measured average SINR when the service reliability is 90%, cell edge CQI is 3 for three different best CQI (5, 9, 12). It is observed that the transmit power increment will decreases as the measured average SINR increases in order to achieve the aim of minimum transmit power. For example, the SNR threshold for $CQI_{best}=5$ is 8.5 dB. According to (22), the SINR threshold is equal to 13.2 dB, which is the sum of SNR threshold (5 dB) corresponding to $CQI_{min}=3$ and FM (8.2 dB) corresponding to SR=90%, as listed in Table 4. FIG. shows ΔP=0 dB when the measured average SINR is 13.2 dB.

The function of the SOPC is to determine the minimum transmit power of the femtocell eNB, which satisfies the receiver performance of BLER≤0.1 in the interference environments. Each input uses three generalized bell shape MFs, which are defined in (1). The 81 fuzzy inference rules are constructed in Table 7. An optimization problem of the minimum transmit power of the ANFIS-SOPC is formally formulated as follows:

In the interference environment, BLER≤0.1, optimize $\Delta P_m = \theta(\vec{x})$, $f(\vec{x})$ is the objective function; subject to:

$\vec{x} \in \{SR_m, CQI_{min,m}, CQI_{best,m} \text{ and } \overline{SINR_m}\}$

70%≤SR≤99%

1≤$CQI_{min}$≤15

1≤$CQI_{best}$≤15

−25 dB≤$\overline{SINR}$≤45 dB $P_{m-1} + \Delta P \in \{\leq 20 \text{ dBm}\}$ (24)

$P_{m-1}$ is the transmit power at $(m-1)_{th}$ instant (dBm)

Figure 18:
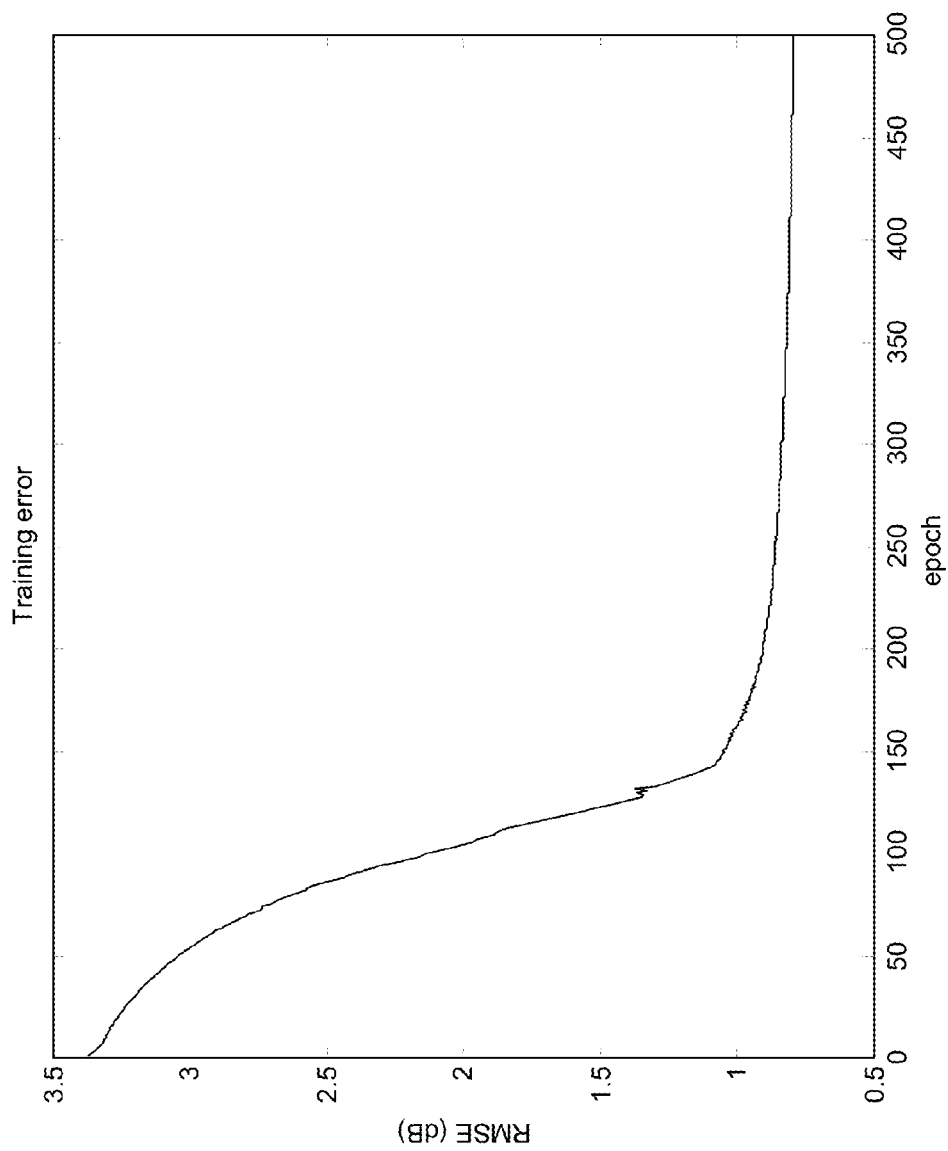
FIG. 18 illustrates root mean square error of SOPC unit.

The premise parameters of three MFs before and after training are shown in FIG. 16 and FIG. 17, respectively. The root mean square error (RMSE) curve of the SOPC is shown in FIG. 18, which demonstrates that the RMSE converges to 0.79 dBm after 300 epochs.

(D) Protection Mechanism of the SOPC:

The protection mechanism of the SOPC is included in the SODCC device to prevent the co-channel interference from the moving users of adjacent cells. The SODCC device inputs the average path loss measured from the UE, and then by the indoor path loss model of (14) to estimate the distance (d) between the UE and the eNB (base station). If the moving UE is inside the coverage range of the radius (R), then the SOPC unit is initiated to transmit the minimum power to the moving UE of the adjacent cells. Otherwise, he SOPC unit is disabling to the moving UE of the adjacent cells.

Figure 19:
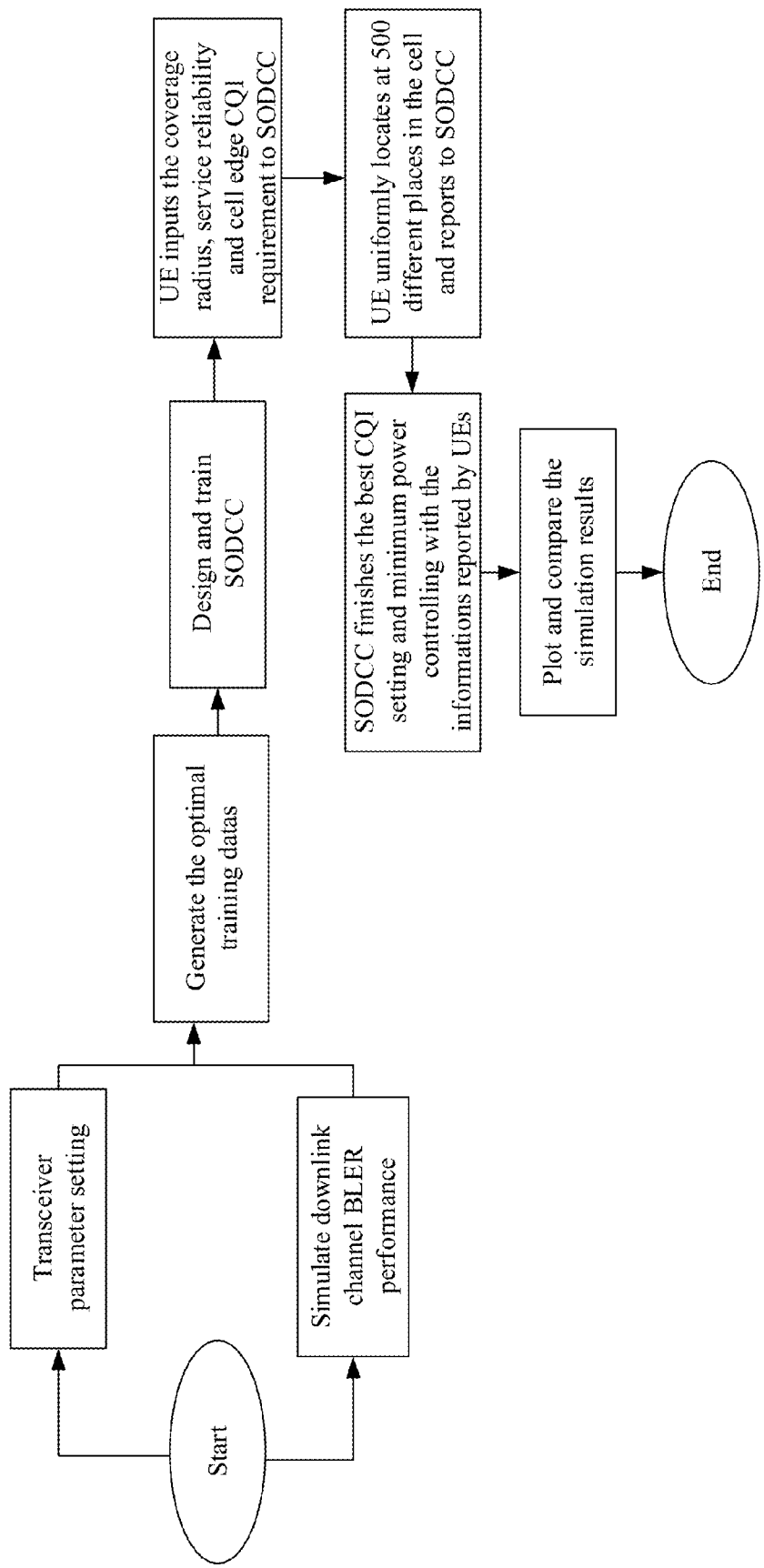
FIG. 19 shows the simulation flow chart of SODCC.

(E) Experimental Results:

FIG. 19 shows the simulation procedure to verify the service reliability. In the experiment, the SINR are measured at uniformly distributed UE positions in an indoor office with coverage radius R. The SINR are measured 1000 times at each UE position. The total number of measurements is defined as $$m_R = \sum_{r=1}^{R} 7r \times 1000 \qquad (25)$$

On the circumference of radius r=1 meter, the SINRs are measured at 7 uniformly distributed positions; on the circumference of the radius r=2, 3, 4, 5 meters, the corresponding uniformly distributed positions are 14, 21, 28, 35, respectively. When the coverage range of indoor office is set as 5 meters, the total number of positions to measure the SINR in an indoor office is 105. The total number of measurement positions increases with the coverage range of femtocell in the indoor office.

The complementary cumulative distribution function (CCDF) of the measured SINR can be expressed as $$F(\text{SINR}_{th}) = P(\text{measured SINR} > \text{SINR}_{th}) \qquad (26)$$

Figure 20A:
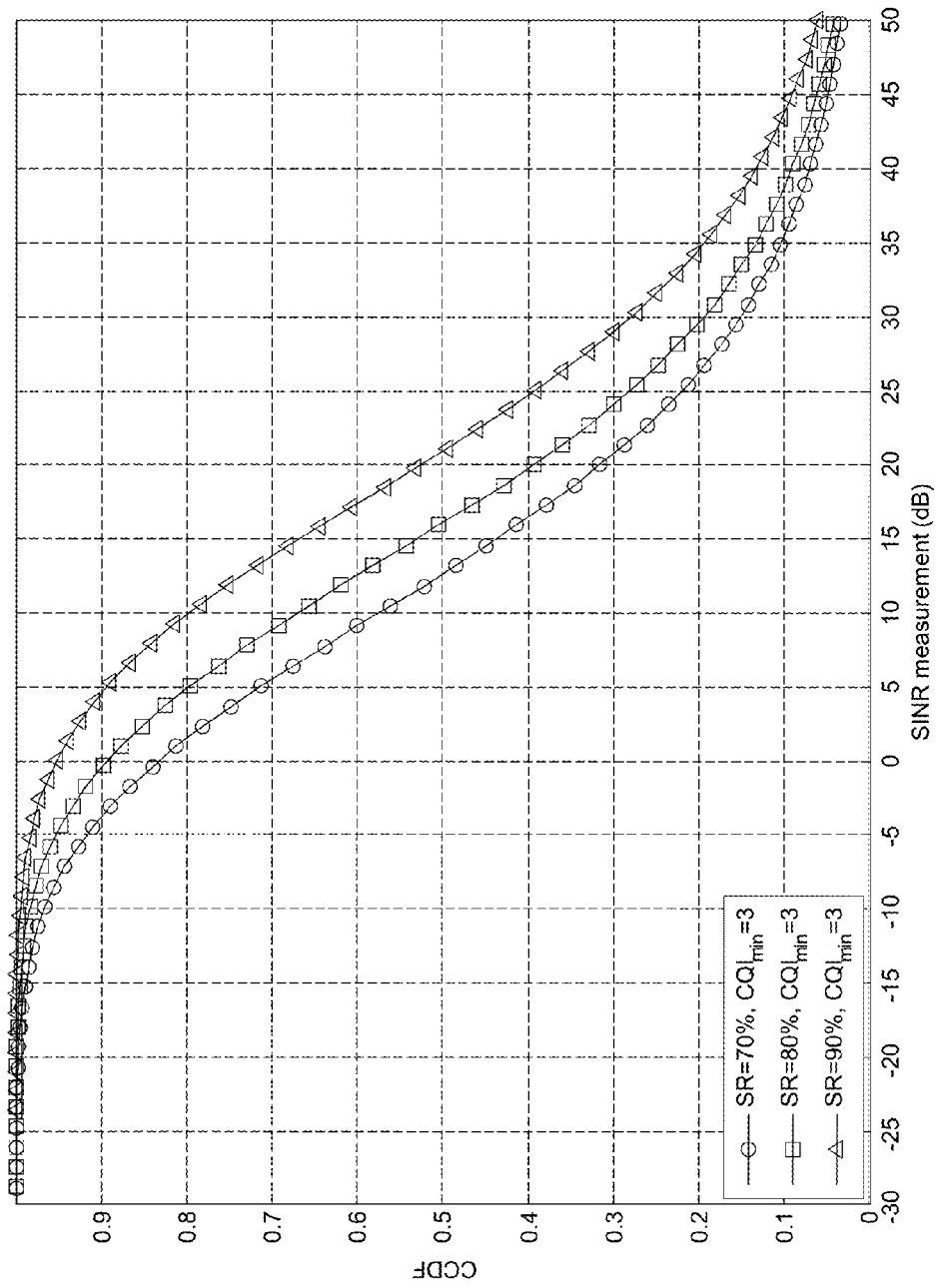
FIG. 20(a) shows CCDF of SINR measurement for $CQI_{min}$=3, coverage radius=5 m, SR=70%, 80%, 90%, interference free.
Figure 20B:
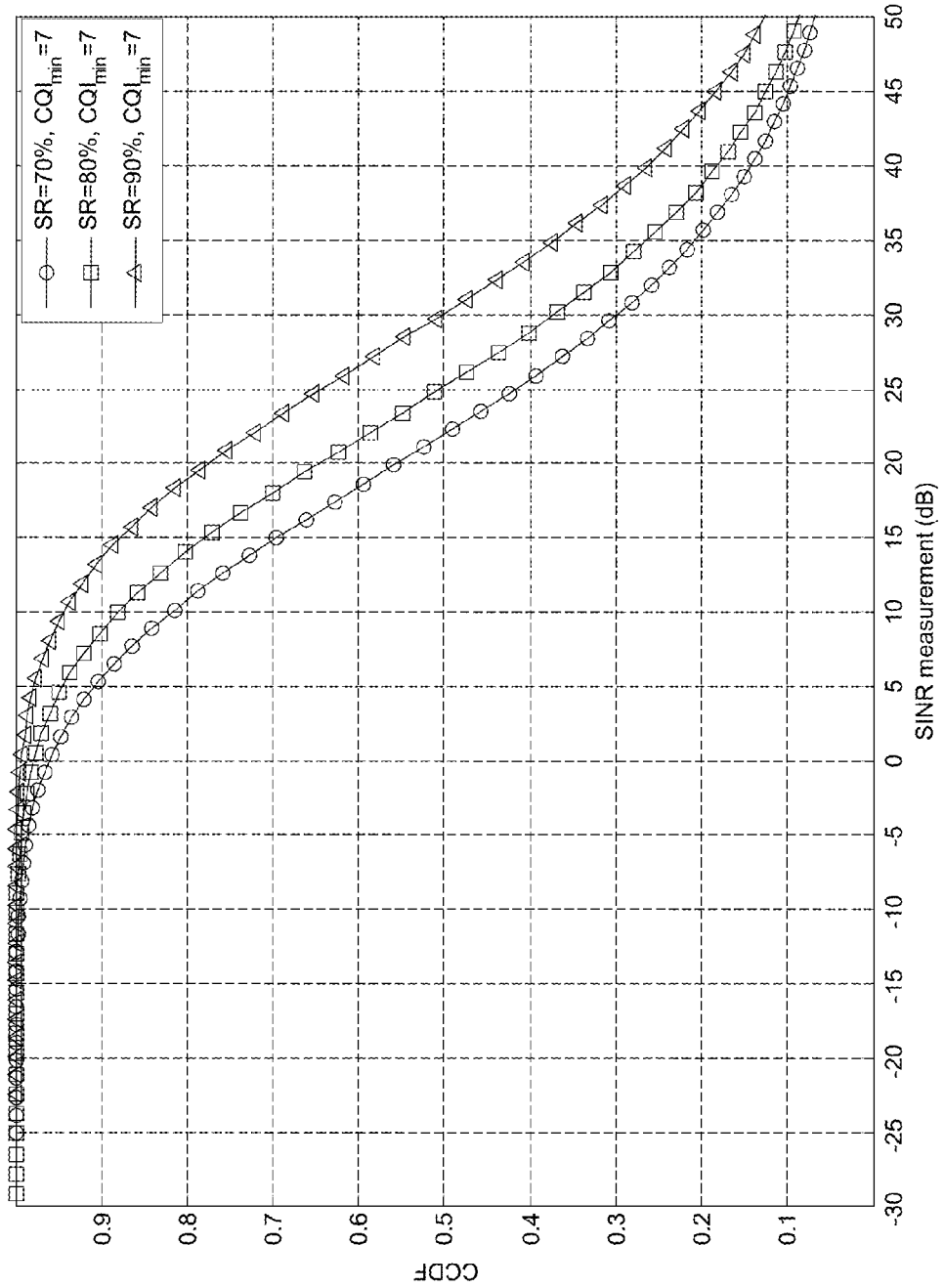
FIG. 20(b) shows CCDF of SINR measurement for $CQI_{min}$=7, coverage radius=5 m, SR=70%, 80%, 90%, interference free.
Figure 20C:
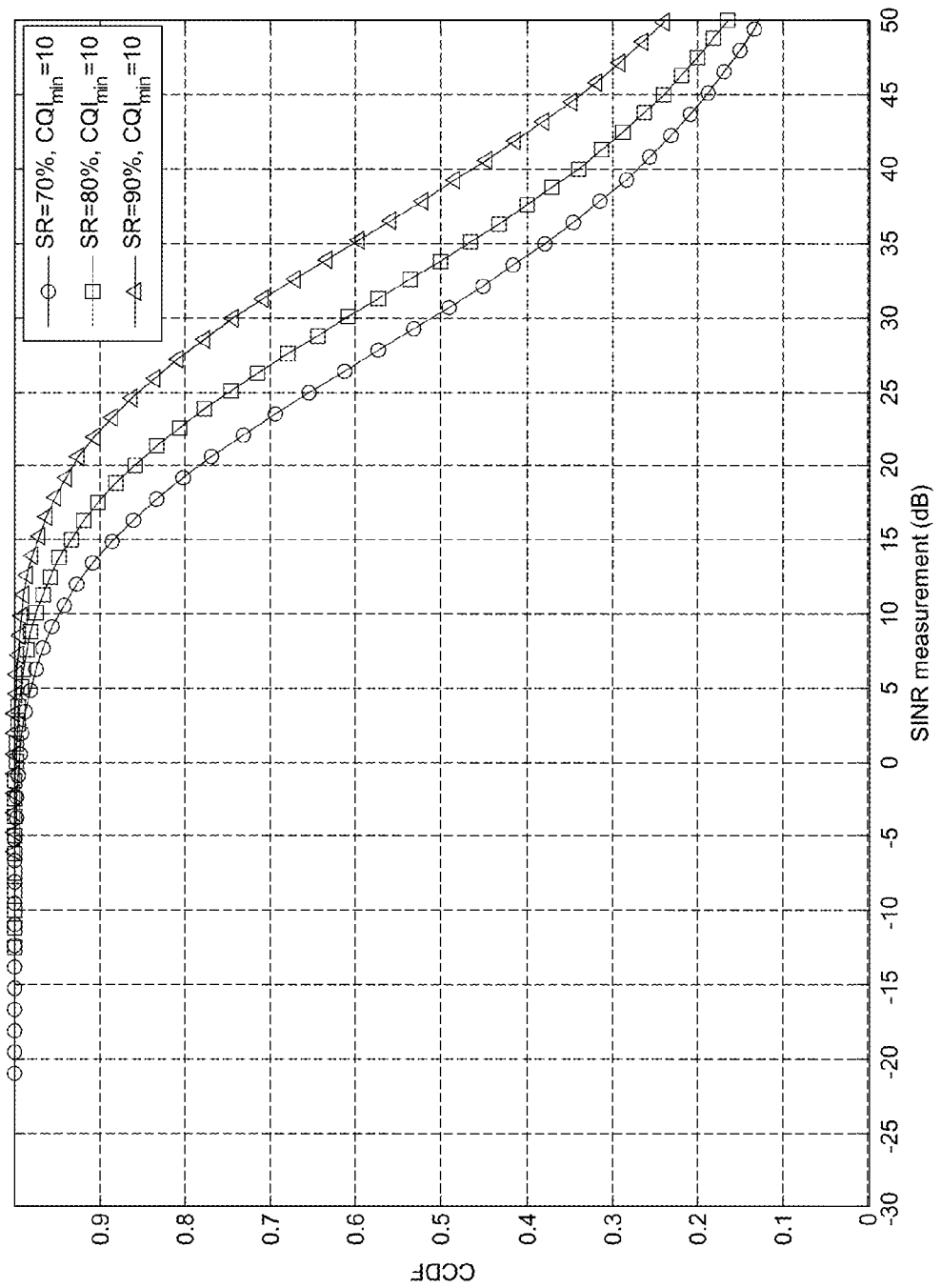
FIG. 20(c) shows CCDF of SINR measurement for $CQI_{min}$=10, coverage radius=5 m, SR=70%, 80%, 90%, interference free.

The CCDF has the same meaning with the system reliability, which is defined as the percentage of the UE locations within a eNB coverage area of radius R for which the received SINR exceeds a given $\text{SINR}_{th}$. FIG. 20 shows the CCDF of the measured SINR for coverage radius of 5 meter, service reliability (70%, 80%, 90%) and different cell edge CQI in the interference free environments. FIG. 20 (*a*), (*b*), (*c*) are corresponding to cell edge CQI (3, 7, 10), respectively. By means of Table 3, it can be found that the $\text{SINR}_{th}$ values corresponding to cell edge CQI 3, 7, and 10 are 5 dB, 13 dB, and 22 dB, respectively. Then the service reliability (SR) of the IPSC can be verified from FIG. 20, which shows the CCDF of measured SINR. For example, in FIG. 20 (*b*), the percentages that the SINK values measured from 105 uniformly distributed positions exceed a given $\text{SINR}_{th}$ of 13 dB corresponding to the service reliabilities of 72%, 80% and 90% are 72%, 81%, 90%, respectively. From FIG. 20(*b*) we can see that, in the interference free environment, only using the IPSC, the femtocell can almost meet the requirement of the service reliability set by the user demand, thus avoiding unnecessary power consumption and interference.

Figure 21A:
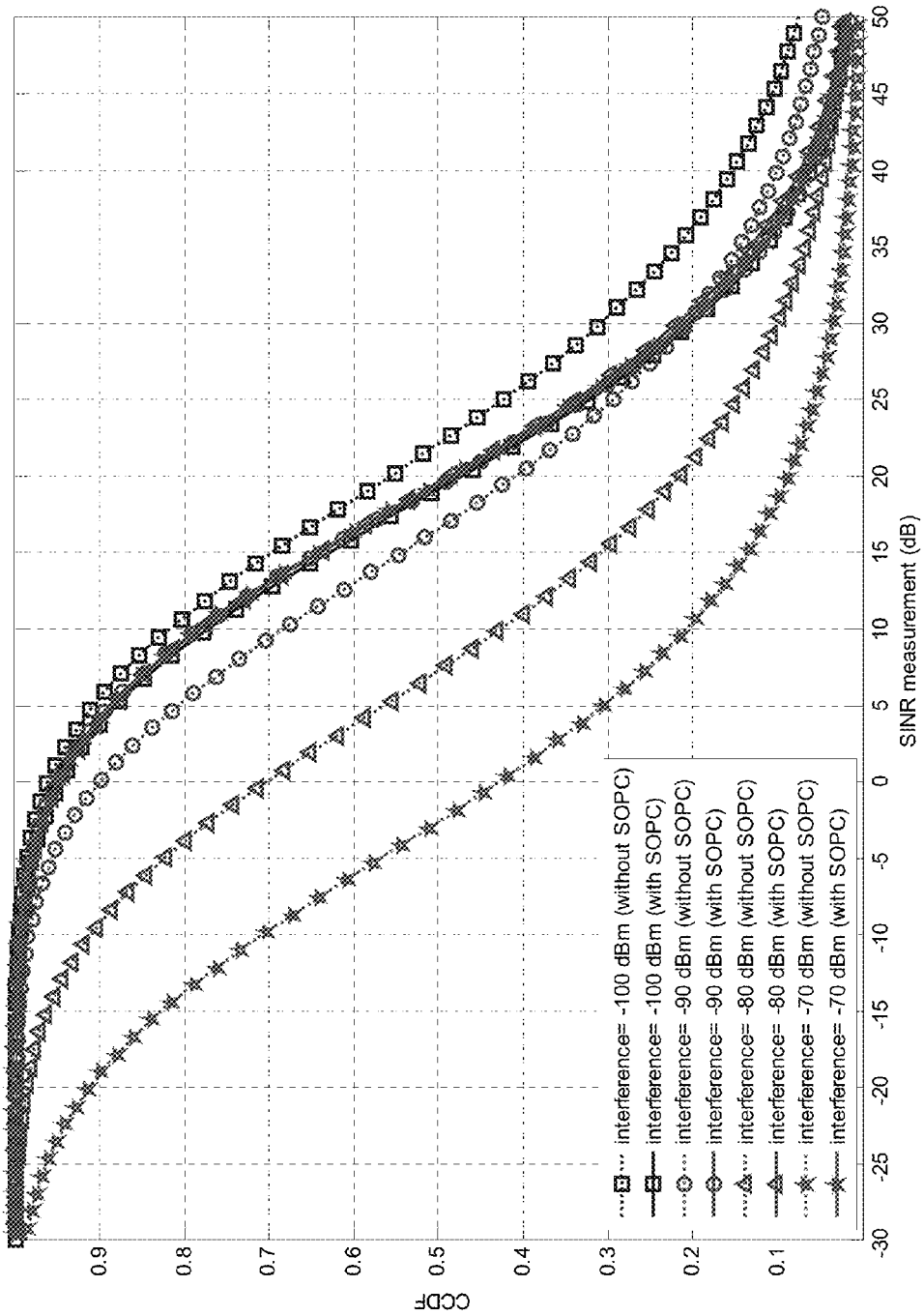
FIG. 21(a) shows CCDF of SINR measurement for $CQI_{min}$=3, coverage radius=5 m, SR=90%, with and without SOPC.
Figure 21B:
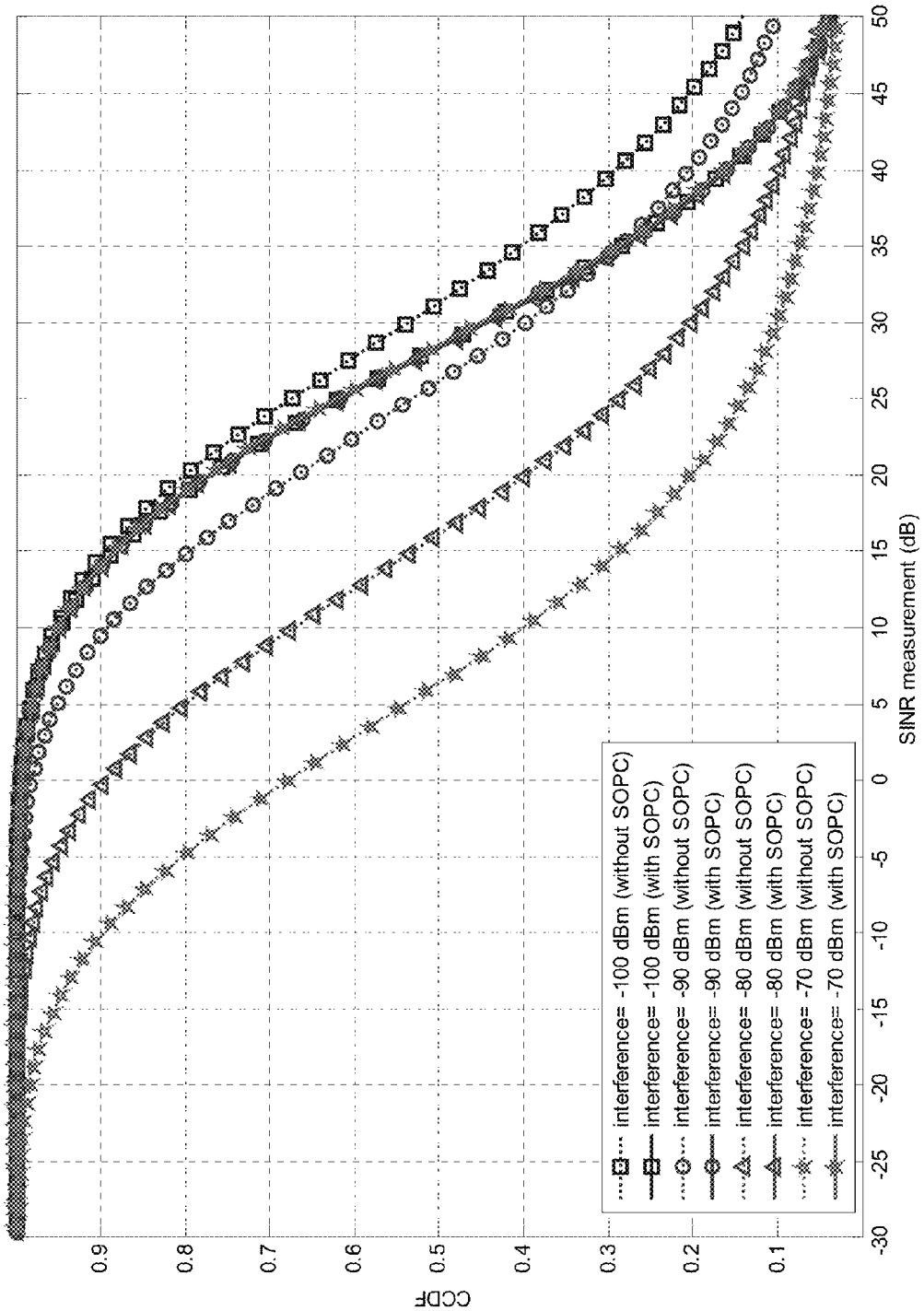
FIG. 21(b) shows CCDF of SINR measurement for $CQI_{min}$=7, coverage radius=5 m, SR=90%, with and without SOPC.
Figure 21C:
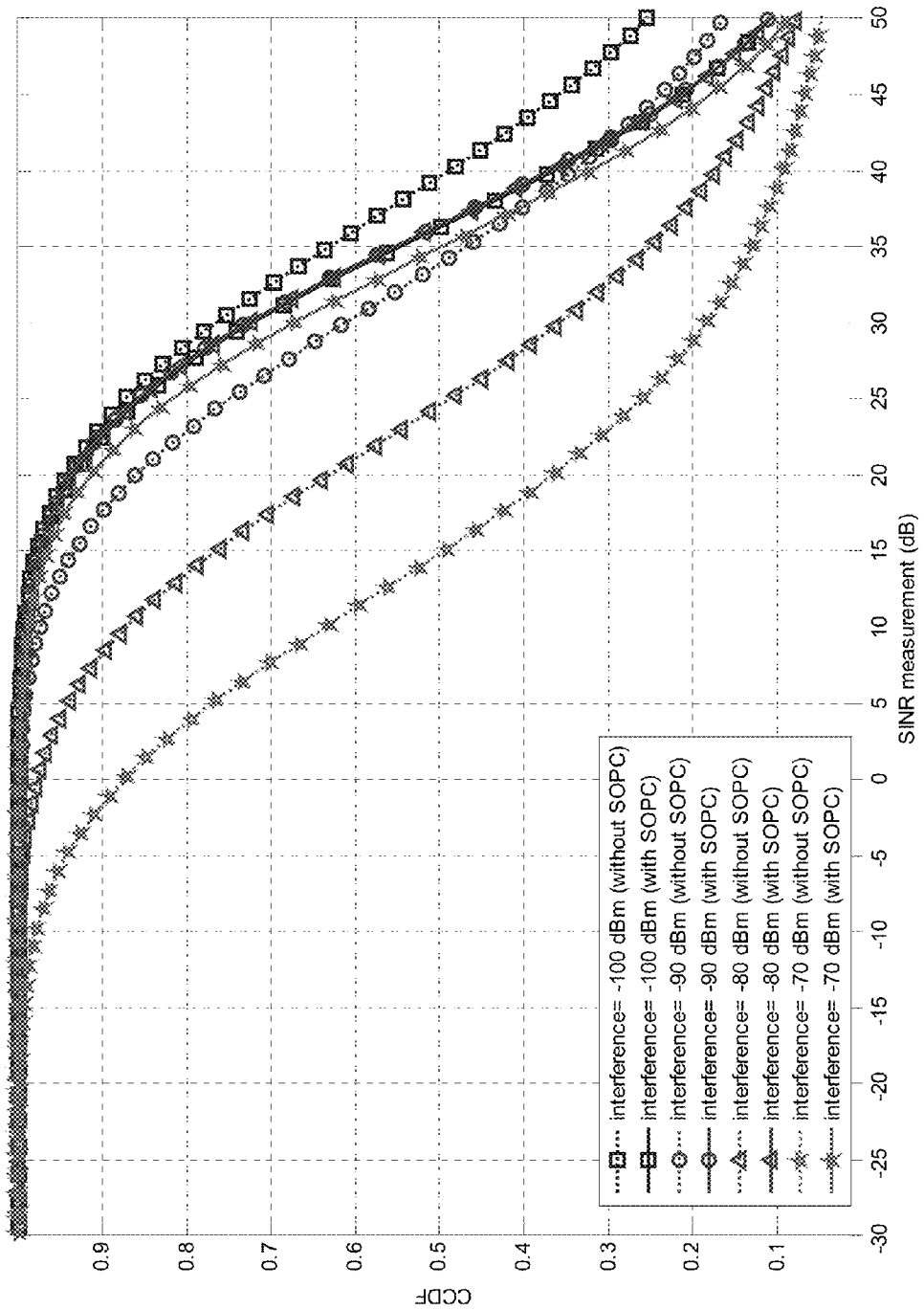
FIG. 21(c) shows CCDF of SINR measurement for $CQI_{min}$=10, coverage radius=5 m, SR=90%, with and without SOPC.
Figure 22A:
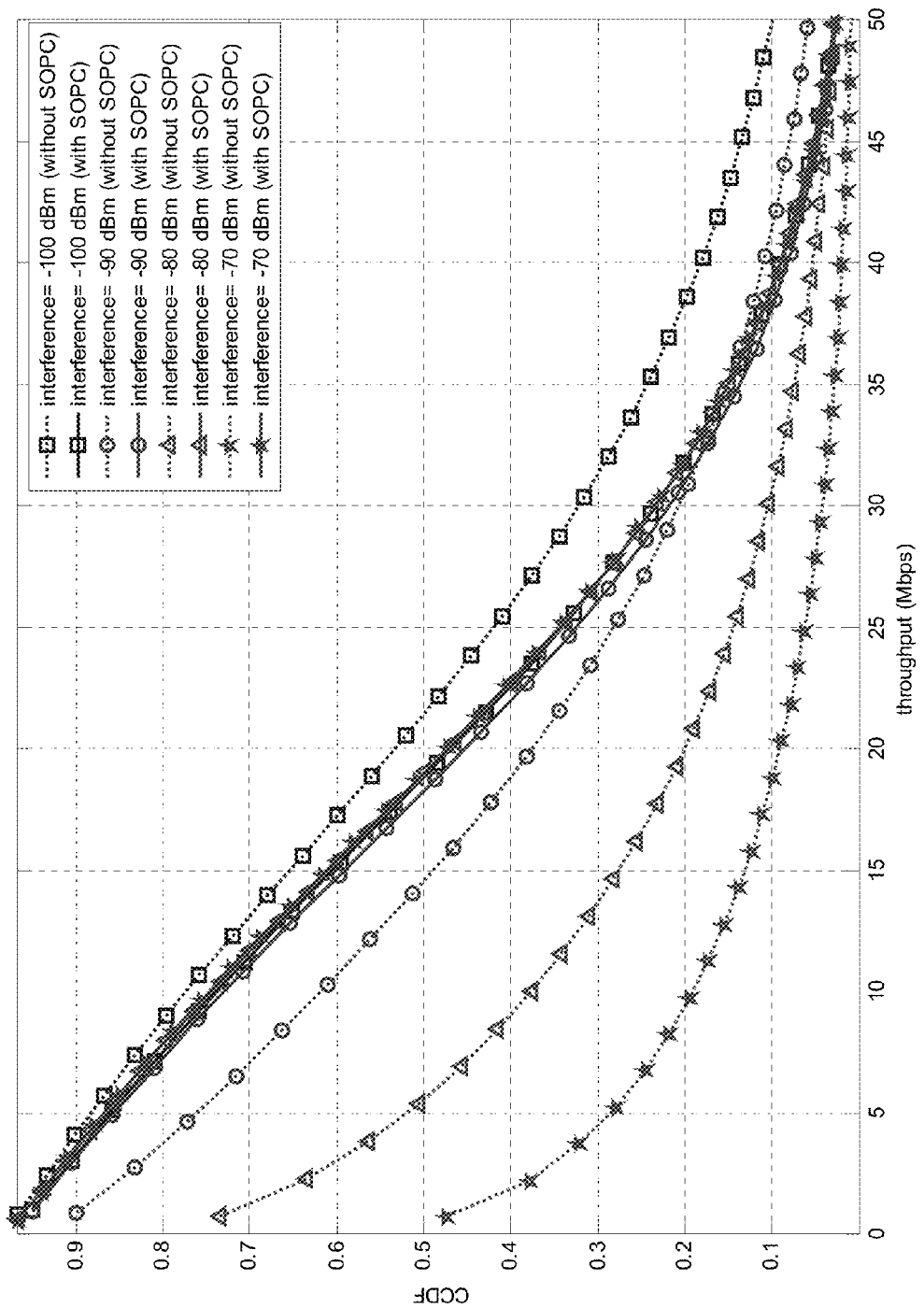
FIG. 22(a) shows CCDF of throughput for $CQI_{min}$=3, coverage radius=5 m, SR=90%, with and without SOPC.
Figure 22B:
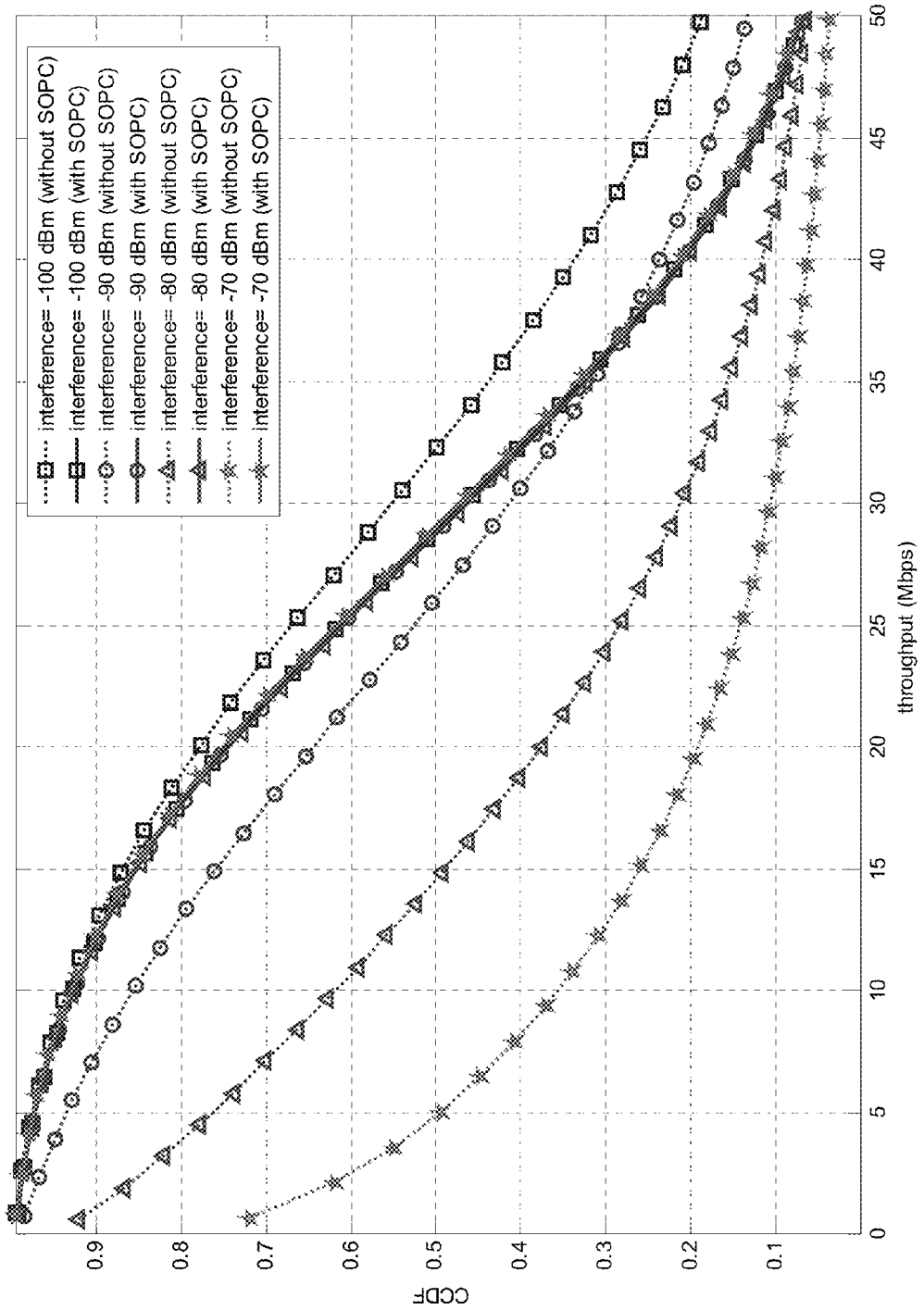
FIG. 22(b) shows CCDF of throughput for $CQI_{min}$=7, coverage radius=5 m, SR=90%, with and without SOPC.
Figure 22C:
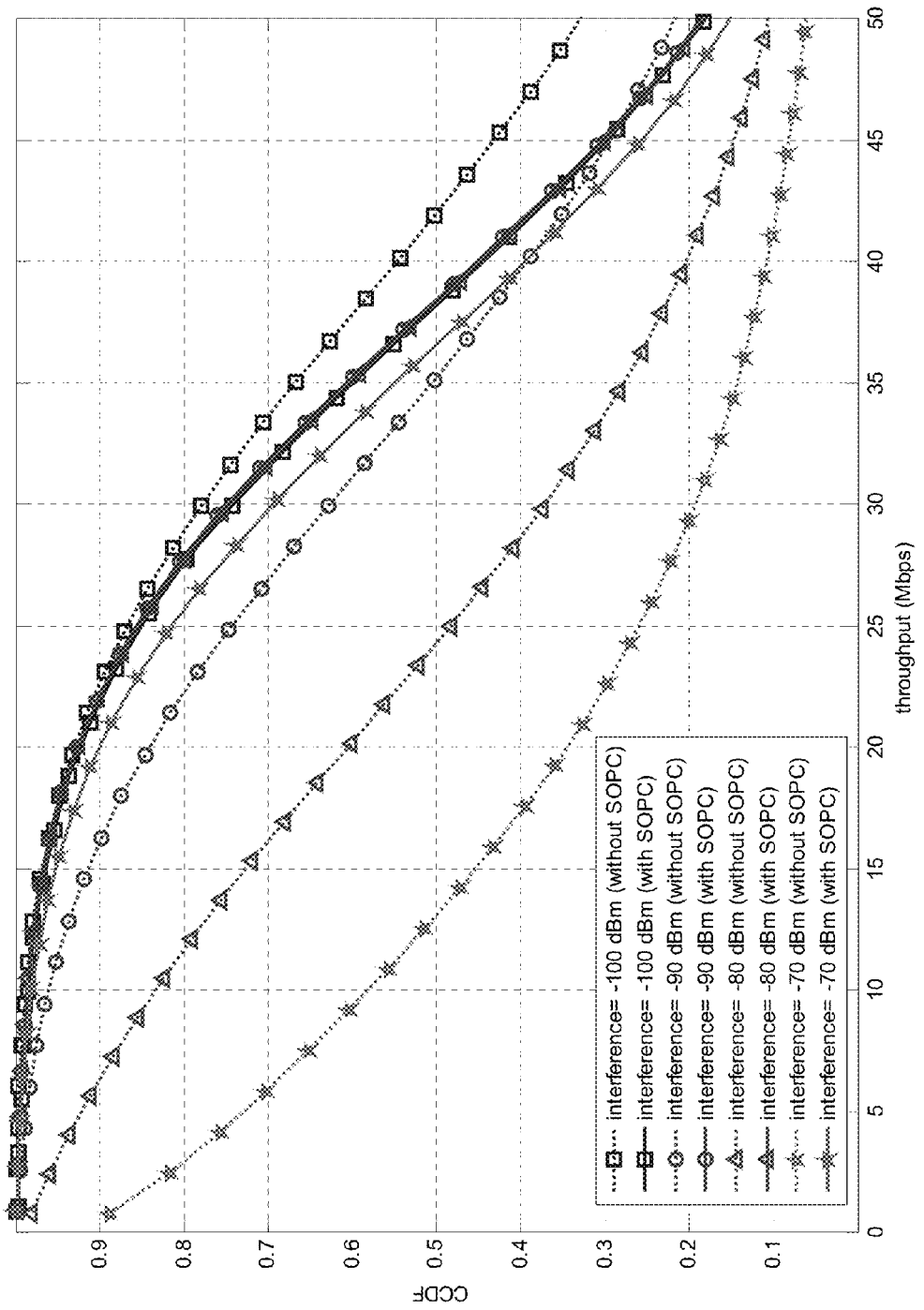
FIG. 22(c) shows CCDF of throughput for $CQI_{min}$=10, coverage radius=5 m, SR=90%, with and without SOPC.

The SINR and throughput service reliabilities of the SOPC for coverage radius of 5 meter, service reliability 90% and different cell edge CQI ($\text{CQI}_{min}$=3, 7, 10) in the interference environments are verified with FIGS. 21 and 22, respectively, where the solid curves denote for combining IPSC and SOPC and the dot curves denote for using the ISPC only. By means of Table 3, it can be found that the $\text{SINR}_{th}$ values corresponding to cell edge CQI 3, 7, and 10 are 5 dB, 13 dB, and 22 dB, respectively. Then (7) is used to calculate the throughputs, which are 4.2 Mbps, 11.3 Mbps and 21.4 Mbps corresponding to cell edge CQI 3, 7, and 10, respectively. For example, as shown in FIGS. 21 (*c*) and 22 (*c*), both the CCDF of the measured SINR in 22 dB and the CCDF of the throughput in 21.4 Mbps are about 91% when the interference power is small (−100 dBm) for both cases of combining IPSC and SOPC method and using the ISPC only. With the increase of interference power, it is observed that using the IPSC only is unable to maintain the service reliability requirements set by the user, but using the SOPC is still able to maintain the requested service reliability. Increasing the interference power to −70 dBm, for example, when using the IPSC only, the CCDF of the measured SINR value in 22 dB and the CCDF of the throughput in 21.4 Mbps is dropped to about 33%, while the SOPC is still able to maintain about 89.5%.

Figure 23:
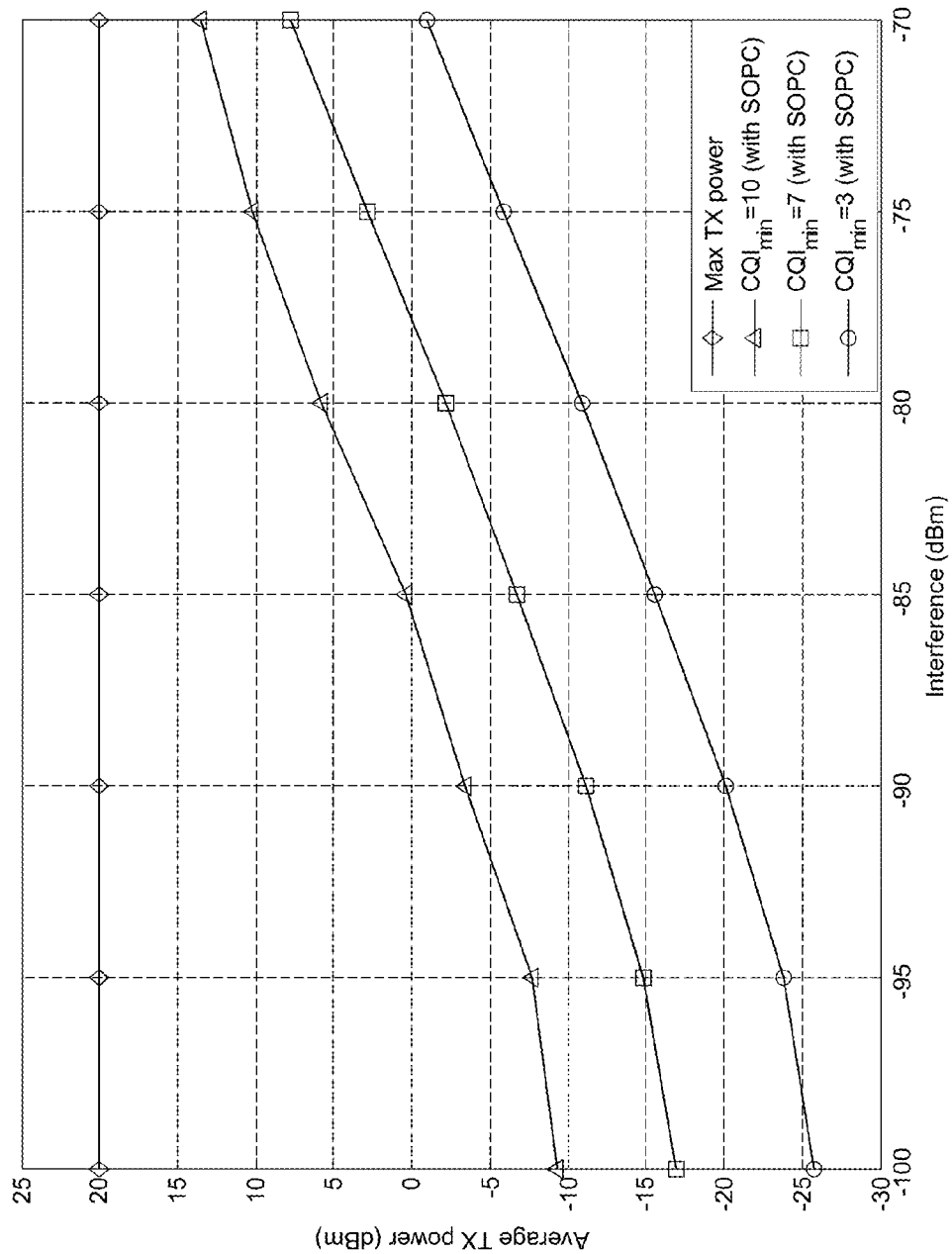
FIG. 23 shows average transmit power of DL transceiver using SOPC and maximum transmit power for $CQI_{min}$=7, coverage radius=5 m, SR=90%, in the MU interference environment.
Figure 24:
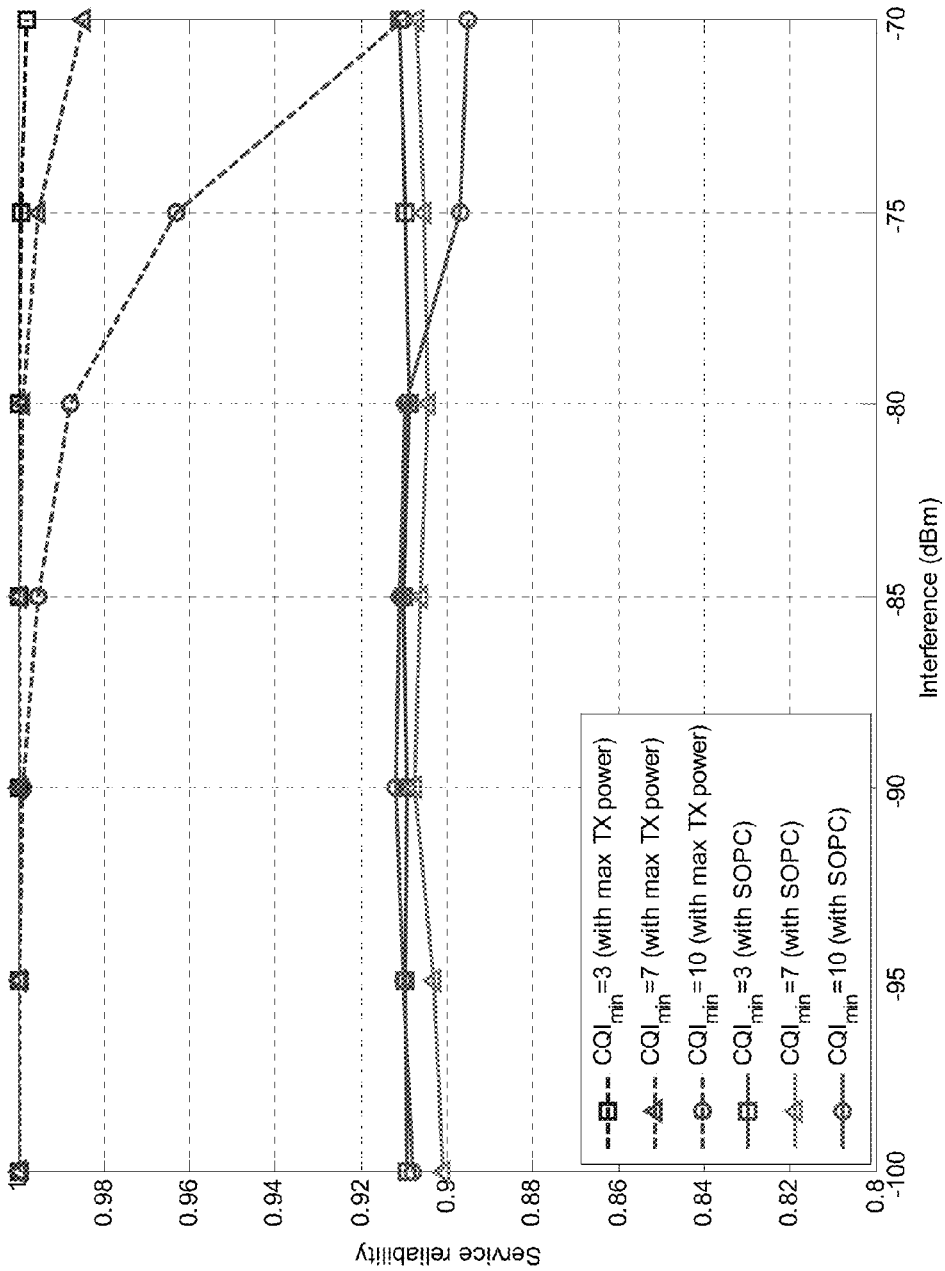
FIG. 24 shows the SR of DL transceiver using SOPC and maximum transmit power for $CQI_{min}$=3, 7, 10, coverage radius=5 m, SR=90%, in the MU interference environment.

FIGS. 23 and 24 show average transmit power and service reliability, respectively, for comparing the SOPC with maximum transmit power in the different interference environments. Using the present SOPC, the average transmit power increases as the interference power increases. For example of $\text{CQI}_{min}$=7, the average transmit power values corresponding to interference power of −90 dBm, −80 dBm and −70 dBm are −11.15 dBm, −2.41 dBm and 7.73 dBm, respectively, which are much less than the maximum transmit power (20 dBm). FIG. 24 compares the service reliability of the SOPC with the fixed maximum transmit power in interference power of −100~−70 dBm, the SOPC is almost able to maintain 90% service reliability set by the user; however, if the fixed maximum transmit power is used, although the service reliability performance is very good, exceeding the 90 percent service reliability, but using the maximum transmission power (20 dBm) will result in an increase in the co-channel interference to the users of the adjacent cells. In $\text{CQI}_{min}$=7, for example, when the interference power is −100~−75 dBm, the actual service reliabilities are about 100% for maximum transmit power, when the interference power increases to −70 dBm, the actual service reliability will decrease to 98.4%; and for the use of the SOPC, when interference power is −100 dBm~−70 dBm, the actual service reliability is able to maintain about 90% set by the user, but the transmit power can be reduced to −17 dBm~7.5 dBm, far less than 20 dBm, and achieve the design goals of energy saving and interference reducing to the users in the neighboring cells.

Thus the simulation results show that the present TDMA based SODCC device for indoor small cell operated in the MU and interference environments to self-optimize the service reliability, throughput at the cell edge, minimum transmit power and interference for multimedia call services. Thus the SODCC device can achieve the goals of saving power consumption and reducing co-channel interference. In this embodiment of the simulation, the basic OFDM transceiver parameters listed in Table 2 is a single antenna mode (SISO), the present invention is also applicable to multi-antenna mode (MIMO) and other different channel environments.

TABLE 1

| | |
|---|---|
| Antenna, transmit mode | MUSISO |
| System bandwidth (MHz) | 10 |
| Channel quality index (CQI) | 1~15 |
| Path loss model | ITU Indoor office A |
| SNR (dB) | −5~50 |
| Quantity of sub frames | 1000 |
| Channel estimation | Least square (LS) |
| Equalizer | MMSE |
| User speed (km/hr) | 10 |

TABLE 2

| | |
|---|---|
| Carrier frequency (MHz) | 1800 |
| System bandwidth (MHz) | 10 |
| Receiver bandwidth (MHz) | 9 |
| Shadow fading standard deviation (dB) | 10 |
| Antenna pattern | Omnidirectional |
| Maximum transmit power (dBm) | 20 |
| Antenna gain of base station (dBi) | 1 |
| Cable loss of base station (dB) | 1 |
| UE antenna gain (dBi) | 0 |
| UE body loss (dB) | 3 |
| UE noise figure (dB) | 8 |
| Path loss model | ITU-R Indoor path loss model |

TABLE 3

| Cell edge throughput (Mbps) | Cell edge CQI | SNR threshold (dB) |
|---|---|---|
| 2.3 | 1 | 1.5 |
| 3 | 2 | 3 |
| 4.2 | 3 | 5 |
| 5.7 | 4 | 7 |
| 6.9 | 5 | 8.5 |
| 10.2 | 6 | 12 |
| 11.3 | 7 | 13 |
| 16.2 | 8 | 17.5 |
| 19.7 | 9 | 20.5 |
| 21.4 | 10 | 22 |
| 26.1 | 11 | 26 |
| 29.1 | 12 | 28.5 |
| 32 | 13 | 31 |
| 37.4 | 14 | 35.5 |
| 42.1 | 15 | 39.5 |

TABLE 4

| Service reliability | 70% | 75% | 80% | 85% | 90% | 95% |
|---|---|---|---|---|---|---|
| Fade margin (dB) | 0 | 1.6 | 3.4 | 5.6 | 8.2 | 12.1 |

TABLE 5

| Input | | | Output | Input | | | Output |
|---|---|---|---|---|---|---|---|
| R | SR | CQI | $P_{ini}$ | R | SR | CQI | $P_{ini}$ |
| L | L | L | −37.856 | M | M | H | 11.4573 |
| L | L | M | −25.356 | M | H | L | −8.0427 |
| L | L | H | −11.856 | M | H | M | 4.45729 |
| L | M | L | −33.856 | M | H | H | 17.9573 |
| L | M | M | −21.356 | H | L | L | −11.887 |
| L | M | H | −7.8563 | H | L | M | 0.61275 |
| L | H | L | −27.356 | H | L | H | 14.1128 |
| L | H | M | −14.856 | H | M | L | −7.8872 |
| L | H | H | −1.3563 | H | M | M | 4.61275 |
| M | L | L | −18.543 | H | M | H | 18.1128 |
| M | L | M | −6.0427 | H | H | L | −1.3872 |
| M | L | H | 7.45729 | H | H | M | 11.1128 |
| M | M | L | −14.543 | H | H | H | 24.6128 |
| M | M | M | −2.0427 | | | | |

TABLE 6

| Input | | Output |
|---|---|---|
| $\overline{PL}$ | $P_{im}$ | $CQI_{best}$ |
| L | L | 8 |
| L | M | 15 |
| L | H | 15 |
| M | L | 1 |
| M | M | 10 |
| M | H | 15 |
| H | L | 1 |
| H | M | 1 |
| H | H | 12 |

TABLE 7

| Input | | | | Output ΔP | Input | | | | Output ΔP |
|---|---|---|---|---|---|---|---|---|---|
| SR | $CQI_{min}$ | $CQI_{best}$ | $\overline{SINR}$ | | SR | $CQI_{min}$ | $CQI_{best}$ | $\overline{SINR}$ | |
| L | L | L | L | 21.6 | M | M | H | L | 46 |
| L | L | L | M | −3.4 | M | M | H | M | 21 |
| L | L | L | H | −28.4 | M | M | H | H | −4 |
| L | L | M | L | 32.5 | M | H | L | L | 51.6 |
| L | L | M | M | 7.5 | M | H | L | M | 26.6 |
| L | L | M | H | −17.5 | M | H | L | H | 1.6 |
| L | L | H | L | 46 | M | H | M | L | 51.6 |
| L | L | H | M | 21 | M | H | M | M | 26.6 |
| L | L | H | H | −4 | M | H | M | H | 1.6 |
| L | M | L | L | 34.1 | M | H | H | L | 51.6 |
| L | M | L | M | 9.1 | M | H | H | M | 26.6 |
| L | M | L | H | −15.9 | M | H | H | H | 1.6 |
| L | M | M | L | 34.1 | H | L | L | L | 32.1 |
| L | M | M | M | 9.1 | H | L | L | M | 7.1 |
| L | M | M | H | −15.9 | H | L | L | H | −17.9 |
| L | M | H | L | 46 | H | L | M | L | 32.5 |
| L | M | H | M | 21 | H | L | M | M | 7.5 |
| L | M | H | H | −4 | H | L | M | H | −17.5 |
| L | H | L | L | 47.6 | H | L | H | L | 46 |
| L | H | L | M | 22.6 | H | L | H | M | 21 |
| L | H | L | H | −2.4 | H | L | H | H | −4 |
| L | H | M | L | 47.6 | H | M | L | L | 44.6 |
| L | H | M | M | 22.6 | H | M | L | M | 19.6 |
| L | H | M | H | −2.4 | H | M | L | H | −5.4 |
| L | H | H | L | 47.6 | H | M | M | L | 44.6 |
| L | H | H | M | 22.6 | H | M | M | M | 19.6 |
| L | H | H | H | −2.4 | H | M | M | H | −5.4 |
| M | L | L | L | 25.6 | H | M | H | L | 46 |
| M | L | L | M | 0.6 | H | M | H | M | 19.6 |
| M | L | L | H | −24.4 | H | M | H | H | −5.4 |
| M | L | M | L | 32.5 | H | H | L | L | 58.1 |
| M | L | M | M | 7.5 | H | H | L | M | 33.1 |
| M | L | M | H | −17.5 | H | H | L | H | 8.1 |
| M | L | H | L | 46 | H | H | M | L | 58.1 |
| M | L | H | M | 21 | H | H | M | M | 33.1 |

TABLE 7-continued

| | Input | | | | | Input | | | |
|---|---|---|---|---|---|---|---|---|---|
| SR | $CQI_{min}$ | $CQI_{best}$ | $\overline{SINR}$ | Output ΔP | SR | $CQI_{min}$ | $CQI_{best}$ | $\overline{SINR}$ | Output ΔP |
| M | L | H | H | −4 | H | H | M | H | 8.1 |
| M | M | L | L | 38.1 | H | H | H | L | 58.1 |
| M | M | L | M | 13.1 | H | H | H | M | 33.1 |
| M | M | L | H | −11.9 | H | H | H | H | 8.1 |
| M | M | M | L | 38.1 | | | | | |
| M | M | M | M | 13.1 | | | | | |
| M | M | M | H | −11.9 | | | | | |

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A time division multiplexing access (TDMA) based adaptive neural fuzzy inference system (ANFIS) self-optimizing deployment cascade control (SODCC) device for indoor small cell operated in the multi-user (MU) and interference environments to self-optimize a service reliability, a throughput, a minimum transmit power and an interference for multimedia call services, using a TDMA method to allocate the resources of an indoor small cell base station to multiple user equipments (UEs), wherein an ANFIS based initial power setting controller (IPSC) in a first unit adapts the initial power setting to a requested service reliability (SR), the throughput at the cell edge of the indoor small cell and a coverage radius, the device comprising:

an ANFIS based channel quality index (CQI) decision controller (CQIDC) in a second unit adapts a best CQI to the initial power setting and average path loss (PL) measured by user equipment (UE);

an ANFIS based self-optimizing power controller (SOPC) in a third unit adapts a transmit power assignment to the requested SR, throughput at a cell edge, corresponding to a cell edge CQI, the best CQI and a measured average SINR; and a protection mechanism for self-optimizing power controller is included in the SODCC device to prevent a co-channel interference from the moving users of adjacent cells;

wherein, the initial power, the best CQI and the minimum transmit power are able to be autonomously cascade assigned to a transceiver according to user input parameters including the SR, the coverage radius and the throughput at the cell edge; a measured average PL and average signal-to-interference-plus-noise ratio (SINR), so that the SODCC device is able to self-optimize the service reliability of the indoor small cell in the multi-user (MU) and interference environments, while maintaining a blocking error rate (BLER) less than $10^{-1}$ and minimizing a transmit power and an interference power to achieve the design aims of energy saving and interference reducing.

2. The time division multiplexing access (TDMA) based adaptive neural fuzzy inference system (ANFIS) SODCC device for indoor small cell operated in the MU and interference environments of claim 1, wherein the TDMA method is used to allocate the total physical resource blocks (PRBs) of the indoor small cell base station (eNode B, eNB) to each user equipments (UE) at each time instant; and wherein the architecture of ANFIS based ISPC unit contains five tiers, a total of three inputs and one output; three input parameters of ANFIS at $m_{th}$ time instant are the requested $SR_m$, coverage radius $R_m$ of indoor office and the cell edge CQI that is defined as $CQI_{min,m}$, the output is a minimum transmit power assignment while maintaining the blocking error rate (BLER) of transceiver less than a resetting value $10^{-1}$; each input uses three generalized bell shape membership functions (MFs); 27 fuzzy inference rules are constructed; a minimum transmit power optimization problem of the ANFIS-ISPC is formally formulated as follows:

in the interference free environments, BLER≤0.1, optimize $P_{ini,m} = f(\vec{x})$ at $m_{th}$ time is instant, $f(\vec{x})$ is the objective function;

subject to:

$\vec{x} \in \{R_m, SR_m, CQI_{min,n}\}$;

0 m < $R_m$ ≤ 15 m;

70% ≤ $SR_m$ ≤ 99%;

$P_{min,m} \in \{\leq 20\ dBm\}$.

3. The TDMA based ANFIS SODCC device for indoor small cell operated in the multi-user (MU) and interference environments of claim 2, wherein the transceiver blocking error rate (BLER) of the IPSC in the interference free environment is set as less than $10^{-1}$;

wherein the number of generalized bell shape membership functions (MFs) of the IPSC is three; and wherein the number of fuzzy inference rules is twenty seven.

4. The TDMA based ANFIS SODCC device for indoor small cell operated in the MU and interference environments of claim 1, wherein the ANFIS based CQIDC unit contains five tiers, a total of two inputs and one output; there are two input parameters at $m_{th}$ time instant including initial power setting ($P_{ini,m}$) and average path loss ($\overline{PL_m}$) between transmitter and receiver; in the interference free environments, the CQIDC unit adapts the best CQI to the changing initial power setting and the measured average path loss; the Gaussian shape membership function of each input parameter is divided into three levels; there are 9 fuzzy inference rules, an optimization problem of the best $CQI_m$ of the ANFIS-CQIDC is formally formulated as follows:

in the interference free environments, BLER≤0.1, optimize $CQI_{best,m} = f(\vec{x})$ at $m_{th}$ time is instant, $f(\vec{x})$ is the objective function;

subject to:

$\vec{x} \in \{\overline{PL_m}, P_{ini,m}\}$;

35 dB ≤ $\overline{PL_m}$ ≤ 85 dB;

−40 dBm ≤ $P_{ini,n}$ ≤ 20 dBm;

$CQI_{best}$ ∈ {1~15}.

5. The TDMA based ANFIS SODCC device for indoor small cell operated in the MU and interference free environments of claim 4, wherein a transceiver blocking error rate (BLER) of the CQIDC in the interference free environment is set as less than $10^{-1}$;
wherein the number of Gaussian shape MFs of the CQIDC is two; and
wherein the number of fuzzy inference rules is nine.

6. The TDMA based ANFIS SODCC device for indoor small cell operated in the MU and interference environments of claim 1, wherein the ANFIS based SOPC unit contains five tiers, a total of four inputs at $m_{th}$ time instant including $SR_m$, $CQI_{min,m}$, the best $CQI_m$ and average measured $SINR_m$ and one output; in the interference environment, the SOPC unit adapts output power increment ΔP to the changing $SR_m$, $CQI_{min,m}$, the best $CQI_m$ and average measured $SINR_m$; the SOPC unit will be coordinated with CQIDC unit to set the minimum transmit power for the transceiver, which switches to a corresponding modulation mode and coding rate; the SOPC unit accepts four inputs and generates the optimizing minimum transmit power; the SOPC unit will continue to estimate the average SINR value in the MU interference environment; the generalized bell shape membership function of each input parameter is divided into three levels; there are 81 fuzzy inference rules; an optimization problem of the minimum transmit power of the ANFIS-SOPC is formally formulated as follows:

in the interference free environments, BLER ≤ 0.1, optimize $\Delta P_m = f(\vec{x})$ at $m_{th}$ time is instant, $f(\vec{x})$ is the objective function;
subject to:

$\vec{x}$ ∈ {$SR_m$, $CQI_{min,m}$, $CQI_{best,m}$ and $\overline{SINR_m}$}

70% ≤ $SR_m$ ≤ 99%

1 ≤ $CQI_{min,m}$ ≤ 15

1 ≤ $CQI_{best,m}$ ≤ 15

−25 dB ≤ $\overline{SINR_m}$ ≤ 45 dB $P_{m-1} + \Delta P_{m1}$ ∈ {≤ 20 dBm}     (24)

$P_{m-1}$ is the transmit power at $(m-1)_{th}$ instant (dBm).

7. The TDMA based ANFIS SODCC device for indoor small cell operated in the MU and interference environments of claim 6, wherein the number of generalized bell shape MFs of the SOPC is four, the number of fuzzy inference rules is eighty one.

8. The TDMA based ANFIS SODCC device for indoor small cell operated in the MU and interference environments of claim 1, wherein a protection mechanism of the SOPC is included in the SODCC device to prevent the co-channel interference from the moving users of adjacent cells, the SODCC device inputs the average path loss measured from the UE, and then by an indoor path loss model to estimate the distance (d) between the UE and an eNB (base station), if the moving UE is inside the coverage range of a radius (R), then the SOPC unit is initiated to transmit the minimum power to the moving UE of the adjacent cells; otherwise, the SOPC unit is disabling to the moving UE of the adjacent cells.

9. The TDMA based ANFIS SODCC device for indoor small cell operated in the MU and interference environments of claim 1, wherein ANFIS architecture, based on the TDMA method, is used to adapt the initial power setting to the requested SR, throughput at the cell edge and the coverage radius in the interference free environment; to adapt the best CQI to the initial setting power and average path loss (PL) measured by user equipment (UE) in the interference free environment; to adapt the transmit power assignment to the requested SR, the throughput at the cell edge, the best CQI and the measured average SINR in the interference environment; a present intelligent SODCC device is design to self-optimize the average signal-to-interference-plus-noise ratio (SINR), the throughput and the service reliability of the indoor small cell in the multi-user (MU) and interference environments, while maintaining the blocking error rate (BLER) less than $10^{-1}$ and minimizing the transmit power and interference power to achieve the aims of energy saving and the interference reducing.

* * * * *